(12) United States Patent
Choudhury et al.

(10) Patent No.: US 11,860,710 B2
(45) Date of Patent: *Jan. 2, 2024

(54) COMPUTER-BASED SYSTEMS INVOLVING AN ENGINE AND TOOLS FOR INCIDENT PREDICTION USING MACHINE LEARNING AND METHODS OF USE THEREOF

(71) Applicant: Capital One Services, LLC, McLean, VA (US)

(72) Inventors: Suvro Choudhury, Glen Allen, VA (US); Cameron Stinson, Washington, DC (US); Kellie Meshell, McLean, VA (US); Henry Real, Arlington, VA (US); Rajarshi Kar, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/538,996

(22) Filed: Nov. 30, 2021

(65) Prior Publication Data

US 2022/0214935 A1 Jul. 7, 2022

Related U.S. Application Data

(63) Continuation of application No. 16/862,413, filed on Apr. 29, 2020, now Pat. No. 11,188,403.

(51) Int. Cl.
*G06F 11/00* (2006.01)
*G06F 11/07* (2006.01)

(52) U.S. Cl.
CPC .......... *G06F 11/004* (2013.01); *G06F 11/008* (2013.01); *G06F 11/0709* (2013.01); *G06F 11/0793* (2013.01)

(58) Field of Classification Search
CPC .. G06F 11/004; G06F 11/008; G06F 11/0709; G06F 11/079; G06F 11/0793
See application file for complete search history.

(56) References Cited

U.S. PATENT DOCUMENTS

| | | | |
|---|---|---|---|
| 7,730,364 B2 | 6/2010 | Chang et al. | |
| 8,024,617 B2 | 9/2011 | Kudo et al. | |
| 8,725,288 B2 * | 5/2014 | Yeung | B07C 3/12 209/584 |
| 9,977,707 B1 | 5/2018 | Nagabushanam | |

(Continued)

FOREIGN PATENT DOCUMENTS

WO 2019125491 A1 11/2019

*Primary Examiner* — Joseph R Kudirka
(74) *Attorney, Agent, or Firm* — Greenberg Traurig, LLP

(57) ABSTRACT

Systems and methods associated with incident prediction using machine learning techniques are disclosed. In one embodiment, an exemplary method may comprise obtaining current raw log data from at least one application log of at least one software application, converting the current raw log data into current tabular log data, applying one or more sampling techniques to the current tabular log data to form current balanced log data, the current balanced log data including incidents of failures, applying one or more machine learning techniques to the current balanced log data to generate an application failure predictive model, and predicting, based on future balanced log data, at least one future failure of the software application using the application failure predictive model.

19 Claims, 12 Drawing Sheets

(56) References Cited

U.S. PATENT DOCUMENTS

| | | |
|---|---|---|
| 10,235,231 B2 | 3/2019 | Zhang et al. |
| 10,289,464 B1 | 5/2019 | DeLozier et al. |
| 2009/0193298 A1 | 7/2009 | Mukherjee |
| 2017/0249200 A1 | 8/2017 | Mustafi et al. |
| 2018/0365091 A1 | 12/2018 | Donaldson et al. |
| 2019/0102277 A1 | 4/2019 | Walenstein et al. |
| 2020/0026589 A1 | 1/2020 | Ghosh et al. |
| 2020/0073781 A1 | 3/2020 | Falko |

\* cited by examiner

COMPUTER-BASED SYSTEMS INVOLVING AN ENGINE AND TOOLS FOR INCIDENT PREDICTION USING MACHINE LEARNING AND METHODS OF USE THEREOF

CROSS-REFERENCE TO RELATED APPLICATION(S) INFORMATION

The present application is a continuation of U.S. patent application Ser. No. 16/862,413, filed Apr. 29, 2020, now U.S. Pat. No. 11,188,403, which are incorporated herein by reference in entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to an improved computer-based platform or system, improved computing components and devices and/or improved computing methods configured for one or more novel technological applications involving an engine and tools comprising features and functionality for incident prediction using machine learning.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or other software associated with data processing, software applications, and/ or addressing failure(s) of software applications.

SUMMARY OF DESCRIBED SUBJECT MATTER

In some embodiments, the present disclosure provides various exemplary technically improved computer-implemented methods for improving incident prediction, including a method having steps such as:
obtaining, by at least one processor, current raw log data from at least one application log of at least one software application;
converting, by the at least one processor, the current raw log data into current tabular log data;
applying, by the at least one processor, one or more sampling techniques to the current tabular log data to form current balanced log data, wherein the current balanced log data includes incidents of failures;
applying, by the at least one processor, one or more machine learning techniques to the current balanced log data to generate an application failure predictive model; and/or
predicting, by the at least one processor and based on future balanced log data, at least one future failure of the software application using the application failure predictive model.

In some embodiments, the present disclosure also provides exemplary technically improved computer-based systems and computer-readable media, including media implemented with and/or involving one or more software applications, whether resident on computer devices or platforms, provided for download via a server and/or executed in connection with at least one network such as via a web application, that include or involves features, functionality, computing components and/or steps consistent with any set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
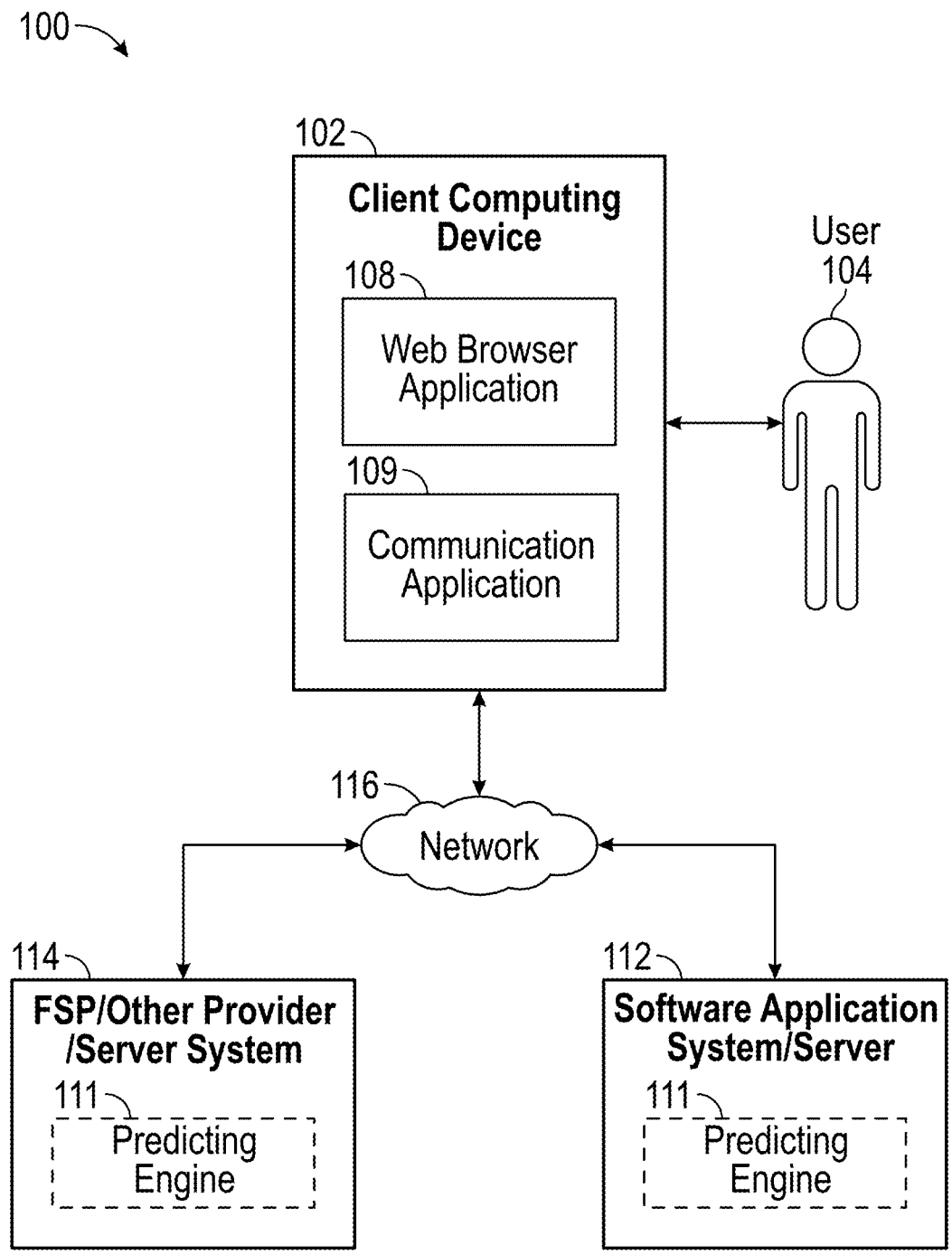
FIG. 1 is a block diagram of an exemplary system and/or platform involving features of incident prediction, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Aspects of the present innovations relate to incident prediction and may comprises various steps including converting raw log data into tabular log data, applying one or more sampling techniques to the current tabular log data to form current balanced log data, applying one or more machine learning techniques to the current balanced log data to generate an application failure predictive model, and predicting at least one future failure of the software application using the application failure predictive model. According to such features, by predicting incidents of failure of software applications in execution, a provider may improve its service performance and productivities on various fronts such as decreasing system down time, decreasing system recovery time, improving customer satisfaction, improving customer loyalty, and realizing increased profitability resulting therefrom. An overview including exemplary workflow that may be performed to enable incident prediction consistent with embodiments herein follows, below.

Further, aspects of the innovations herein may involve various technical solutions required for incident prediction, such as technical solutions associated with aspects including but not limited to converting raw application logs into tabular log data, balancing log data, generating and/or training machine learning models for incident prediction, as well as utilizing and/or validating incident prediction models.

Turning to the basic workflow of a provider who wishes to be able to predict incidents of failure during the execution of a software application, aspects of systems and methods herein may involve an incident prediction engine to predict when or whether an incident is about to occur. As used herein, incidents of failure (also "incidents") are defined as when an application fails to work as intended. Examples of such incidents of failure may include, though are not limited to, a file being absent from an expected location within the application, server not responding, and other incidents that cause the application to fail to work as intended.

FIG. 1 is a block diagram of an exemplary system and/or platform 100 involving features of incident prediction, consistent with disclosed embodiments. System 100 may be configured for executing one or more software applications and incident prediction processes consistent with disclosed embodiments. As shown, system 100 may include a computing device 102, such as a client computing device, associated with a user 104. Computing device 102 may be configured to execute, among other programs, a web browser application 108 and a communication application 109. System 100 may further include a software application system/server 112, and a system or server associated with one or more financial services providers (FSPs) and/or other providers or entities 114, such as merchants and other providers that host online user services, that wish to maintain reliable execution of software applications for customers and users. As shown, computing device 102, software application system/server 112, and FSP/other provider system 114 may be communicatively coupled by a network 116. Various functionality and benefits of web browser application 108 and communication application 109 may also be achieved via one or more modules 111 within, or more directly associated with, a software application system/server 112, and/or a FSP/other provider system 114, for example, such as those associated with one or more predicting engine. For simplicity of explanation, various communication and/or behavior of such computer systems and/or components (i.e., 108, 109 and 111) are generally discussed below by referring to operation of the web browser applications or systems.

A financial services provider (FSP) system or server may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

FSP/other provider system 114 may be one or more computing devices configured to perform operations consistent with providing a predicting engine 111 that are accessible by software application system/server 112 over network 116. For example, incident predictions may be provided via software application system/server 112 through predicting engine 111. In some embodiments, FSP/other provider system 114 may be associated with a merchant that provides goods or services, other service providers, or other entities that provide online customer or user accounts. The disclosed embodiments are not limited to any particular configuration of FSP/other provider system 114.

While only one computing device 102, web browser application 108, module 111, communication application 109, software application system/server 112, FSP/other provider system 114, and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 102 may be one or more computing devices configured to perform operations consistent with executing web browser application 108 and communication application 109. One illustrative computing device 102 is further described below in connection with FIG. 3.

Web browser application 108 may be one or more software applications configured to perform operations consistent with providing web pages to the user, accessing online accounts, as set forth herein, as well as searching and obtaining desired information from web pages, and the like. Here, for example, web browser application 108 may be configured to provide various information, such as incident prediction information, associated with various software incident activities related to the user 104. Such processing may occur by or with a web browser application 108, locally, or the web browser application 108 may transmit requests to and/or operate with one or more other software applications and/or computing components to search for and obtain the desired information. Web browser application 108 may also be hosted and/or operated, in whole or in part, by a web browser system and/or server, described below in connection with FIG. 2. Web browser application 108 is further described below in connection with FIG. 3.

Communication application 109 may be one or more software applications, modules, routines, subroutines and/or extensions configured to provide services for user 104 at client computing device 102. In some embodiments, communication application 109 includes web browser application 108. Communication application 109 may be configured to perform operations consistent with one or more predicted incidents during an execution thereof on client computing device 102.

Software application system/server 112 may be one or more computing devices configured to host one or more software applications consistent with providing one or more services to user 104. For example, communication application 109 may be provided at computing device 102 over network 116. In some embodiments, FSP/other provider system 114 may also be hosting one or more software applications to provide services to user 104 at client computing device 102 over network 116. For example, the one or more software applications may involve online financial services through which user 104 may engage. In some embodiments, software application system/server may be configured with a predicting engine 111 to monitor for incidents during the executing course of the one or more software applications. In other embodiments, predicting engine 111 may be configured remotely from software application system/server 112, detail of which is described below. Further, in some embodiments, software application system/server itself may be configured at FSP/other provider system 114.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
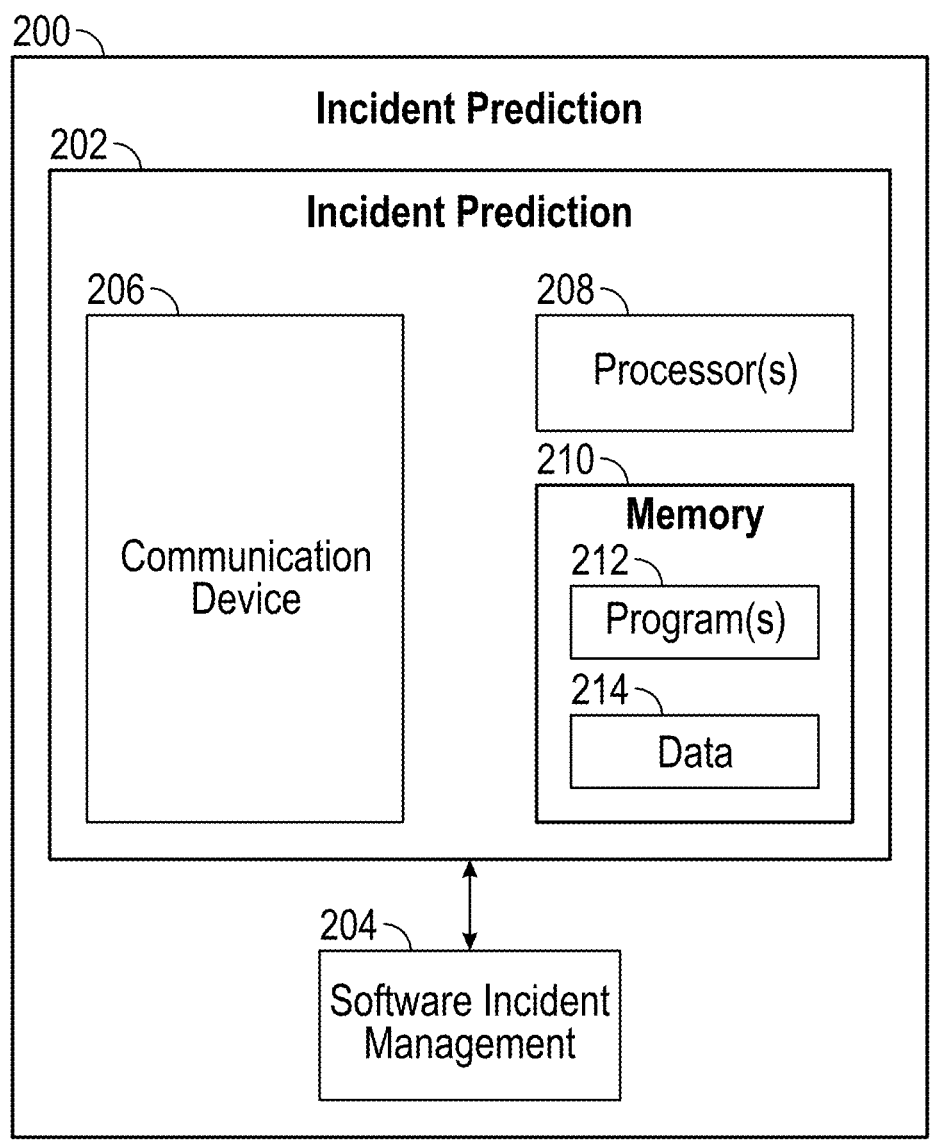
FIG. 2 is a block diagram of an exemplary system and/or platform involving features of incident prediction, consistent with exemplary aspects of certain embodiments of the present disclosure.

FIG. 2 is a block diagram of an exemplary incident prediction system 200, consistent with disclosed embodiments. As shown, incident prediction system 200 may include incident prediction server 202 (e.g., prediction engine) and software incident management application 204. Incident prediction server 202 may include a communication device 206, one or more processor(s) 208, and memory 210 including one or more programs 212 and data 214. Incident prediction server 202 may be configured to perform operations consistent with providing software incident management application 204.

Incident prediction server 202 may take the form of a server, general purpose computer, mainframe computer, or any combination of these components. Other implementations consistent with disclosed embodiments are possible as well. Software incident management application 204 may take the form of one or more software applications stored on a computing device, such one or more software application stored on software application system/server 112 described above.

Communication device 206 may be configured to communicate with one or more computing devices, such as software application system/server 112. In some embodiments, communication device 206 may be configured to communicate with the computing device(s) through software incident management application 204. Incident prediction server 202 may, for example, be configured to provide instructions and/or operating information to software incident management application 204 through communication device 206. Communication device 206 may be configured to communicate other information as well.

Communication device 206 may be further configured to communicate with one or more systems associated with incident prediction, such as one or more of software application system 112, FSP/other provider system 114, and the like. In some embodiments, such systems may operate or execute software application being subject to incident prediction, and communication device 206 may be configured to communicate with such systems to generate, transmit and/or process incident-prediction-related information or instructions regarding the subject software application. Communication device 206 may be configured to communicate with such system(s) in other manners. Communication device 206 may be configured to communicate with other components as well.

Processor(s) 208 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. S1, . . . processors) family manufactured by Apple™, or any of various processors manufactured by Sun Microsystems, for example. The disclosed embodiments are not limited to any type of processor(s) otherwise configured to meet the computing demands required of different components of incident prediction system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. Such operations may include web browsing activities as well as creation and/or transmission of incident-prediction-related information. The disclosed embodiments are not limited to separate programs or computers configured to perform dedicated tasks. For example, memory 210 may include a single program 212 that performs the functions of incident prediction system 200, or program(s) 212 may comprise multiple programs. Memory 210 may also store data 214 that is used by program(s) 212.

In certain embodiments, memory 210 may store one or more sets of instructions involved with carrying out the processes described below. Other instructions are possible as well. In general, instructions may be executed by processor(s) 208 to perform one or more processes consistent with disclosed embodiments. In some embodiments, program(s) 212 may include one or more subcomponents configured to generate and/or process instructions and information for use by software incident management application 204 in performing log data collecting, log data processing, prediction model fitting, and other activities associated with providing incident prediction services.

The components of incident prediction system 200 may be implemented in hardware, software, or a combination of both hardware and software, as will be apparent to those skilled in the art. For example, although one or more components of incident prediction system 200 may be implemented as computer processing instructions, all or a portion of the functionality of incident prediction system 200 may be implemented instead in dedicated electronics hardware. In some embodiments, incident prediction system 200 may also be communicatively connected to one or more database(s) (not shown). Alternatively, such database(s) may be located remotely from incident prediction system 200. Incident prediction system 200 may be communicatively connected to such database(s) through a network, such as network 116 described above. Such database(s) may include one or more memory devices that store information and are accessed and/or managed through incident prediction system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data to the database(s).

Figure 3:
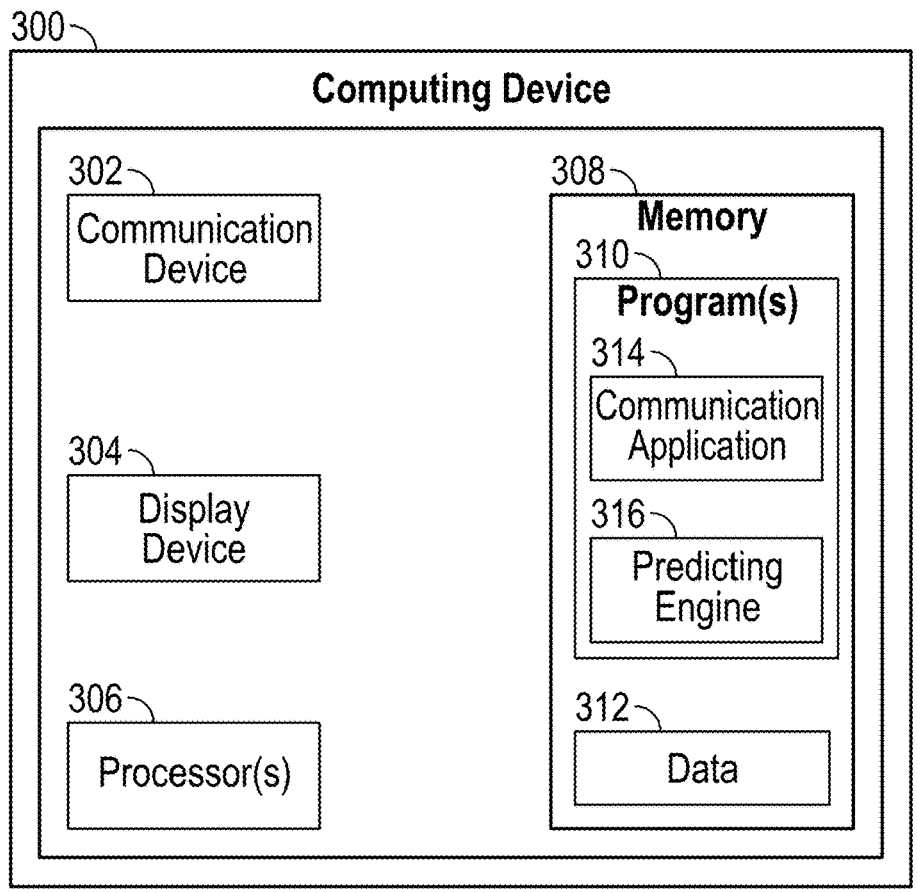
FIG. 3 is a block diagram of an exemplary computing device that may be associated with incident prediction, consistent with exemplary aspects of certain embodiments of the present disclosure.

FIG. 3 is a block diagram of an exemplary computing device 300, consistent with disclosed embodiments. As shown, computing device 300 may include communication device 302, display device 304, processor(s) 306, and memory 308 including program(s) 310 and data 312. Program(s) 310 may include, among others, communication application 314 and predicting engine program 316. In some embodiments, computing device 300 may take the form of a desktop or mobile computing device, such as a desktop computer, laptop computer, smartphone, tablet, or any combination of these components. Alternatively, computing device 300 may be configured as other fixed, portable, and/or mobile device, and/or any other device suitable for carrying on a user's person. Other implementations consistent with disclosed embodiments are possible as well. Computing device 300 may, for example, be the same as or similar to software application system/server 112 described above.

In the example embodiment shown, communication device 302 may be configured to communicate via one or more networks with the various computer systems and servers disclosed elsewhere herein. In some embodiments, communication device 302 may be further configured to communicate with one or more other providers, such as FPS/other provider system 114 described above, and/or client computing device 102. Communication device 302 may be configured to communicate with other components as well. Communication device 302 may be configured to provide communication over a network, such as network 116 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Display device 304 may be any display device configured to display interfaces on computing device 300. The interfaces may be configured, e.g., for incident prediction related information provided by computing device 300 through predicting engine 111. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. In certain embodiments, memory 308 may store sets of instructions for carrying out some processes performed in connection with implementations described herein. Other instructions are possible as well. In general, instructions may be executed by processor(s) 306 to perform one or more processes consistent with disclosed embodiments.

In some embodiments, program(s) 310 may include a communication application 314. Communication application 314 may be executable by processor(s) 306 to perform operations including, for example, communicating information and/or performing other communications associated with the incident prediction. Such communications may be processed by processor(s) 306 as well as displayed, for example, via display device 304. In some embodiments, such communications may be associated with systems, such as FSP/other provider system 114, and the like, described above. Communication application 314 may be executable by processor(s) 306 to perform other operations as well. In some embodiments, program(s) 310 may further include a predicting engine program 316, such as a program, application, and/or module associated with incident prediction. This predicting engine program 316 may, for example, be a program or module corresponding to predicting engine 111 described above. Predicting engine program 316 may be executable by processor(s) 306 to perform various operations including, for example, collecting log data, processing log data, applying machine leaning techniques to generate prediction model, etc., as described or associated with incident prediction herein and/or accessed by computing device 300 via predicting engine program 316. Other instructions are possible as well. In general, instructions may be executed by processor(s) 306 to perform one or more processes consistent with disclosed embodiments.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronics hardware.

Figure 4:
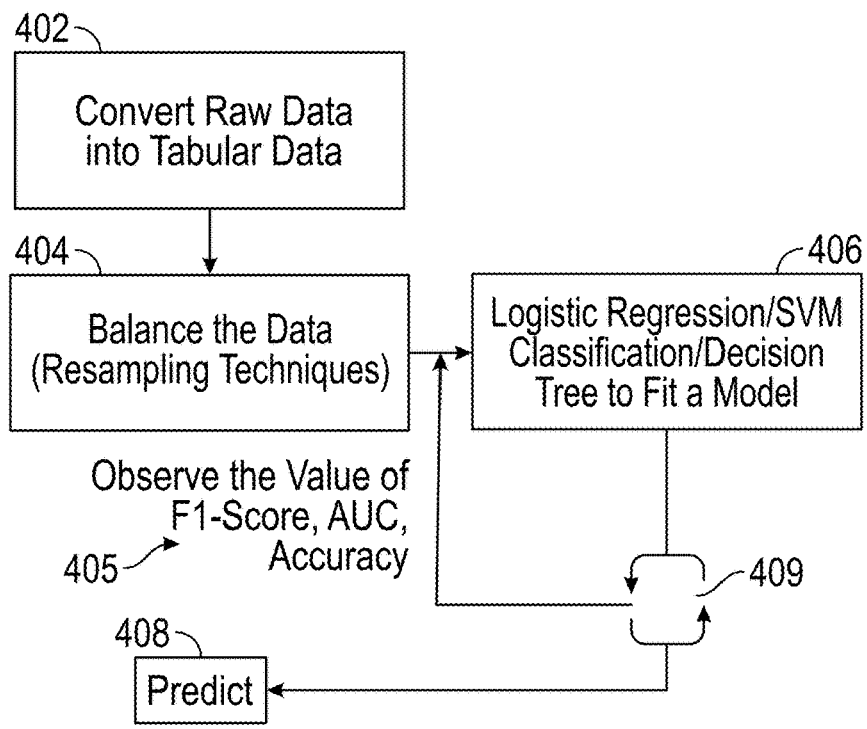
FIG. 4 illustrates a schematic diagram depicting exemplary operations of an exemplary incident prediction process consistent with exemplary aspects of certain embodiments of the present disclosure.

FIG. 4 is a schematic diagram depicting exemplary operations of one exemplary incident prediction process, consistent with exemplary aspects of at least some embodiments of the present disclosure. As shown herein via this exemplary flow diagram, an incident prediction process 400 may comprises a converting stage 402, a balancing stage 404, a model fitting stage 406, and a predicting stage 408. According to some illustrative embodiments herein, at the converting stage 402, raw application logs are converted into tabular log data. In one example, raw application data includes current raw log data from at least one application log of at least one software application. At the balancing stage 404, the tabular log data is further processed to generate balanced log data. In one example, one or more resampling/sampling techniques are applied to the tabular log data to form balanced log data. In implementations, the balanced log data may include incidents of failures resulting from the execution of at least one software application.

As used herein, 'raw log data' is defined as any log data log data that has yet to be processed, parsed or altered in any way, such as logs received from a system directly. As used herein, "tabular log data" is defined as data that has been altered either by processing the data or parsing the data into rows.

In some embodiments, at the model fitting stage 406, one or more machine learning techniques are applied to the balanced log data to generate an incident predictive model. In some embodiments, here, for example, logistic regression and/or linear regression, structure vector machine, classification, and/or decision trees and the like may be used to generate the incident predictive model. In some implementations, the model fitting stage 406 may be perpetuated in a cycle of model fitting at stage 409, where validations, measurement, and modifications are applied at stage 405 to the update incident predictive model. As such, the incident predictive model is updated via being fitted again using one or more machine technologies and training datasets. In some embodiments, the validation and modification may include techniques including measuring the value of F1-score, area under curve (AUC), accuracy, and the like. At the predicting stage 408, the incident predictive model is utilized to make a prediction, e.g., to predict at least one future failure of a software application, based on future balanced log data.

In some embodiments, application data from software applications may obtained as original raw logs, such as those shown in Table 1, below. In various embodiments, the software application may be a software application running to provide services internal of an institution, or services external to an institution (e.g., to customers of the institution). An original raw log may include one or more features that characterize the data captured therein. Generally, such features are limited in its numbers, including, for example, generic features of: a log time, a date, a time stamp, a log type, and a log message recording one or more items of information regarding the execution of the software program. A log message can indicate that a program is starting, a function completes successfully, what the input parameters are for a function, where the log file is store, and so on. As such, the raw log data having various information regarding the execution of a software application is in a congregated form, difficult to be interpreted as information pertinent to analyzing the execution status towards predicting incidents of failures.

TABLE 1

| Log-name | Date | Time | Unix - Time | Cat. | Day Wk | Mon. | Success | Time | Log Cat. | Bus. Name | Log Func | Bus. Proc. | Log Name |
|---|---|---|---|---|---|---|---|---|---|---|---|---|---|
| Log0 | Jun. 19, 2017 | 19:00:26 | 1497913226 | [ ] | 1 | 6 | 1 | 19 | 1 | 0 | 26 | 0 | 100260 |
| Log1 | Jun. 19, 2017 | 19:00:26 | 1497913226 | [ ] | 1 | 6 | 1 | 19 | 1 | 0 | 26 | 0 | 100260 |
| Log2 | Jun. 19, 2017 | 19:00:26 | 1497913226 | [ ] | 1 | 6 | 1 | 19 | 1 | 0 | 26 | 0 | 1002600 |
| Log3 | Jun. 19, 2017 | 19:00:26 | 1497913226 | [ ] | 1 | 6 | 1 | 19 | 1 | 0 | 26 | 0 | 100260 |
| Log4 | Jun. 19, 2017 | 19:00:26 | 1497913226 | [ ] | 1 | 6 | 1 | 19 | 1 | 0 | 26 | 0 | 100260 |
| Log5 | Jun. 19, 2017 | 19:00:26 | 1497913226 | [ ] | 1 | 6 | 1 | 19 | 1 | 0 | 26 | 0 | 100260 |
| Log6 | Jun. 19, 2017 | 19:00:26 | 1497913226 | [ ] | 1 | 6 | 1 | 19 | 1 | 0 | 26 | 0 | 100260 |
| Log7 | Jun. 19, 2017 | 19:00:26 | 1497913226 | [3] | 1 | 6 | 1 | 19 | 1 | 0 | 26 | 0 | 100260 |
| Log8 | Jun. 19, 2017 | 19:00:26 | 1497913226 | [ ] | 1 | 6 | 1 | 19 | 1 | 0 | 26 | 0 | 100260 |
| Log9 | Jun. 19, 2017 | 19:00:26 | 1497913226 | [ ] | 1 | 6 | 1 | 19 | 1 | 0 | 26 | 0 | 100260 |

Next, at the converting stage 402, according to some embodiments herein, the raw log data may be converted to tabular log data to extract, clarify, refine, transform, model, and/or otherwise generate additional features that characterize the log content. Various techniques may be used to process the raw log data to provide additional details regarding log entries. For example, based on the above-described generic features, a new set of features may be generated to include features of: log name, date, time, timestamp, message, category, day of the week, month of the year, success, hour of the day, minute of the hour, and/or day of the month, and so on. In this example, when the raw log data records a time and date in a log, such date and time may be modeled into features of date, hour of the day, minute of the hour, day of the week, month of the year, unix timestamp, etc.

In some embodiments, a dictionary may be generated for the current tabular log data. The dictionary is configured to have a dictionary entry for each instance of log data. For example, the dictionary entries may be comprised of 5 or more of log name, date, time, timestamp, message, category, day of the week, month of the year, success, hour of the day, minute of the hour, and/or day of the month. In some embodiments, data in the dictionary is generated via looping through every line of the log data and appending information regarding each said dictionary entry into the dictionary. For example, the raw log data may be comprised of three log types, including outbound logs, inbound logs, and batch logs.

In some embodiments, one or more string names associated with one or more dictionary entries to numerical values may be updated. Such updating may include, for example: processing a list of dictionary entries and a category variable; looping-through a list of job names, from the one or more string names, to parse out a Business name, a Log Function name, a Business Function name, a Business Process name, and a numerical Log name; looping-through a list of Business names, correlating each said Business name to a number, and returning a first numerical value; looping-through a list of Log Function names, correlating each said Log Function name to a number, and returning a second numerical value; looping-through a list of Business Function names, correlating each said Business Function name to a number, and returning a third numerical value; looping-through a list of Business Process names, correlating each said Business Process name to a number, and returning a fourth numerical value; and creating the numerical Log name via combining two or more of the first numerical value, the second numerical value, the third numerical value, and the fourth numerical value together to form the numerical Log name, wherein each said numerical Log name comprises a complete unique numerical identifier for each string name.

In other embodiments, a dictionary associated with the current tabular log data may be updated by processing dictionary list entries comprised of an argument field, an index field, a Dictionary List field, a Log Category field, a Business Name field, a Log Function field, a Business Function field, a Business Process field, and a Log Name field; and updating and adding fields comprising the Log Category field, the Business Name field, the Log Function field, the Business Function field, the Business Process field, and a Log Name to the dictionary, wherein the Log Name is a unique numerical identifier created by combining a plurality of fields into one unique value.

In some embodiments, the model fitting cycle stage 409 may include a perpetual cycle that starts with a first sub-stage of obtaining a prototype of the predictive model that has been generated. The cycle progresses into a second sub-stage in which an ASV is chosen for fine tuning and validation. At a third sub-stage, the predictive model is retrained via collecting training data such that the predictive model is finalized. At the fourth sub-stage, the finalized or fine-tuned predictive model is used to predict incidents of failure again. Based on the various performance measured for the predictive model, the fourth sub-stage continues back to the first sub-stage to retrain the model again.

At the model fitting stage 406, in some embodiments, a definition of an anomaly associated with the execution of a software application may, first, be defined. For example, such anomaly can include the issues that the operation staff addresses in general, and/or encountered in the past. A model defining failures in the software application may be determined by processing the past incidents of the parsed log data regarding one or both of: one or more incidents of the failures; and/or (ii) one or more times of occurrence of the failures. Various techniques may be utilized to implement detecting and correlation of anomalies. In some embodiments, series of timestamped log data may be used to create a benchmark data to train a machine learning model on what log data reflects normal operations of a software application. Next, a logistic regression model may be generated using the benchmark data. Subsequently, as above-described, the log data is further processed to generate additional features about the log data content. In some embodiments, the additional features are used to determine and/assess a condition or context under which an error, exception, or other mal-functioning event occurs during the execution of a software application. Then, the logistic regression model is trained again with sampling techniques. For example, the logistic regression model may be trained again with a combination of under-sampling and LASSO logistic regression operation.

Figure 5A:
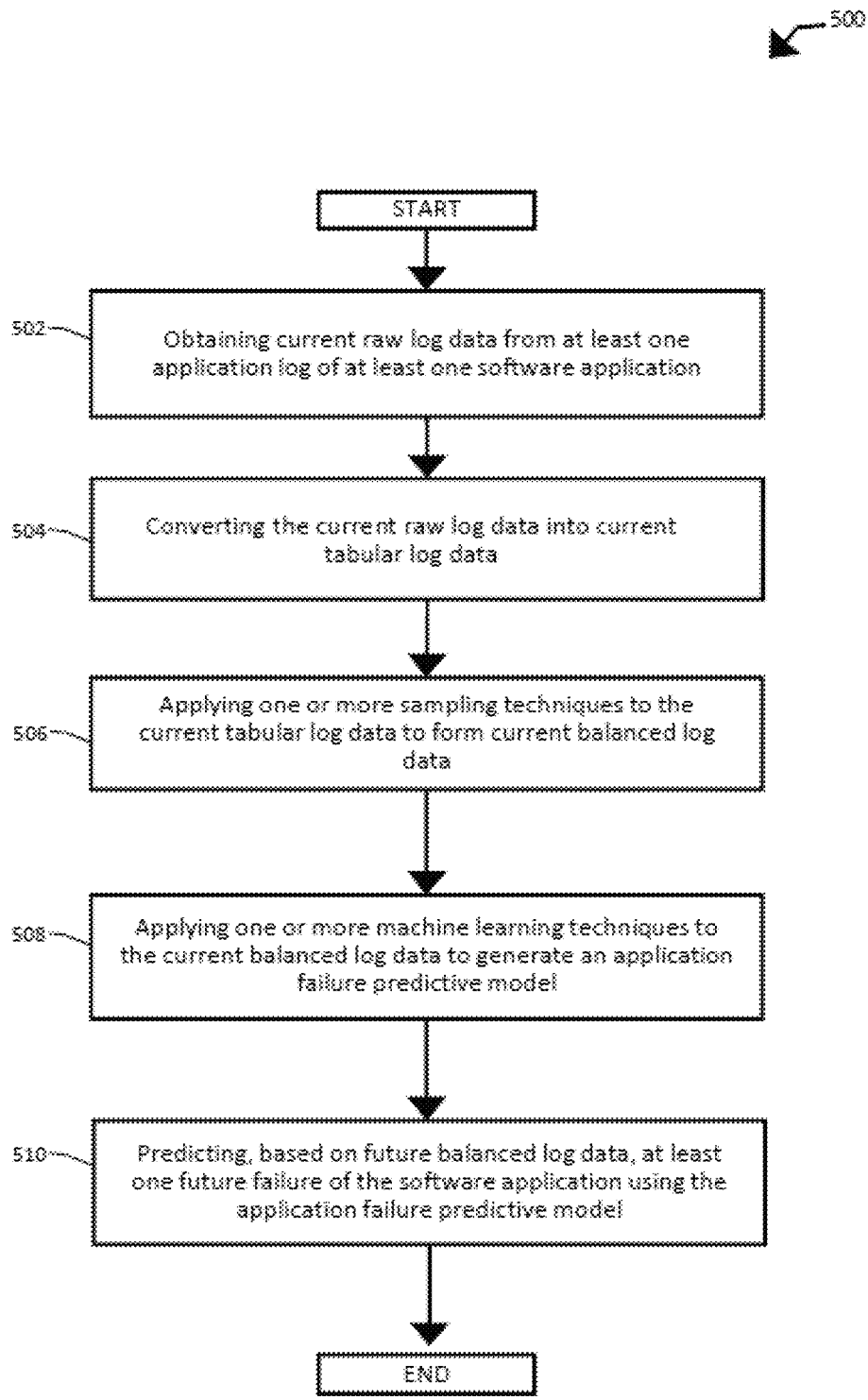
FIGS. 5A-5C are flowcharts illustrating exemplary processes related to incident prediction, consistent with exemplary aspects of certain embodiments of the present disclosure.

FIG. 5A is a flowchart illustrating one exemplary process 500 related to incident prediction using machine learning techniques, consistent with exemplary aspects of at least some embodiments of the present disclosure. As shown in the exemplary flowchart of FIG. 5A, an illustrative incident prediction process 500 may comprise: obtaining current raw log data from at least one application log of at least one software application, at 502; converting the current raw log data into current tabular log data, at 504; applying one or more sampling techniques to the current tabular log data to form current balanced log data, at 506; applying one or more machine learning techniques to the current balanced log data to generate an application failure predictive model, at 508; and predicting, based on future balanced log data, at least one future failure of the software application using the application failure predictive model, at 510. Further, the incident prediction process 500 may be carried out, in whole or in part, online, e.g. via an incident prediction engine and/or it may be carried out by in conjunction with any software application functionality, described above.

In some embodiments, incident prediction process 500 may include, at 502, a step of obtaining current raw log data from at least one application log of at least one software application. With regard to the disclosed innovations, such current raw log data may be comprised of data collected from an application log of a software application. Here, for example, the current raw log data may comprise data collected from an application log including information items pertaining to a log name, date, time, log type, message captured therein, and the like. Implementations herein may be configured such that the at least one application log may be obtained by accessing a log file generated by the software application, by a system on which the software application is executing, and/or a Logging as a Service (LaaS) application or tool. Further, according to various embodiments, step 502 may be performed by at least one processor, such as a processor associated with at least one financial institution. Such financial institution may include a bank, credit card issuer, or any other type of financial service entity that generates, provides, manages, and/or maintains financial service accounts for one or more individuals, as well as providing online financial applications, both in the back scene and at the user front end, to deliver services enabled for such financial accounts.

The incident prediction process 500 may include, at 504, a step of converting the current raw log data into current tabular log data. Further, according to various disclosed embodiments, the current tabular log data may comprise a set of one or more information items (e.g., features) in addition to those information items associated with the current raw log data, as described above. In some embodiments, the set of one or more information items may comprise information that clarifies and/or describes with detail at finer granularity the content of the current raw log data. Here, for example, the set of one or more information items may comprise data pertaining to unix_time, categories, day of week, month of year, hour of day, minute of hour, day of month, log category, success, business name, and the like. Implementations herein may be configured such that the current raw log data may be converted using any suitable data manipulation and/or analysis techniques. In one exemplary embodiment, Pandas may be utilized to convert the current raw log data into the current tabular log data. In some embodiments, step 504 may be performed by the at least one processor.

Incident prediction process 500 may include a step of applying one or more sampling techniques to the current tabular log data to form current balanced log data, at 506. With regard to the disclosed innovations, such current balanced log data may include incidents of failures. In some embodiments, step 506 may be performed by the at least one processor. In one embodiment, the one or more sampling techniques may comprise an undersampling technique. In some implementations, the undersampling technique may comprise parsing the current tabular log data into majority class data and minority class data, reducing the majority class data to a size commensurate with the size of the minority class data; and/or generating the current balanced log data using the reduced-size majority class data and the minority class data. In other implementations, step 506 may comprise one hot encoding of the current raw log data.

Incident prediction process 500 may include, at 508, a step of applying one or more machine learning techniques to the current balanced log data to generate an application failure predictive model. In some embodiments, step 508 may be performed by the at least one processor. Further, implementations herein may be configured such that step 508 may comprise utilizing logistic regression to determine relationships between at least one dependent variable of the current balanced log data and one or more independent variables of the current balanced log data. Here, for example, the logistic regression may comprise a least absolute shrinkage and selection operator (LASSO) logistic regression that performs variable selection and regularization of the current balanced log data.

Further, incident prediction process 500 may include, at 510, a step of predicting, based on future balanced log data, at least one future failure of the software application using the application failure predictive model. In various embodiments, step 510 may be performed by the at least one processor.

According to some embodiments, methods herein may also comprise splitting the current balanced log data into training data and testing data. In some other embodiments, the training data and the testing data may be utilized to verify the model's integrity.

According to some embodiments, methods herein may also comprise configuring the tabular data into a readable tabular format. In some other embodiments, one or both of the applying the one or more sampling techniques and/or the applying the one or more machine learning techniques may be performed on the readable tabular format of the tabular data. In some implementations, the configuring the tabular data into the readable tabular format may include generating a dictionary and fields that provide additional details regarding the log data. Here, for example, the dictionary and fields may be stored with the readable tabular format of the tabular data in a virtual Python environment. In other implementations, generating a dictionary for the current tabular log data. Implementations herein may be configured such that the dictionary may comprise a dictionary list and dictionary entries for each element of log data.

According to various embodiments, in connection with configuring the tabular data into the readable tabular format, one or more of the following may be performed by the method herein: returning a dictionary list; scanning a row of the dictionary list to generate keys that are used as column headers for in the readable tabular format; writing, to a CSV file, the keys that correspond to the column headers; and/or writing rows from the dictionary list to fill the CSV file.

According to some embodiments, methods herein may also comprise transforming the raw log data into a readable format; and/or generating input date, time, logType, and message fields for each instance of the transformed raw log data.

According to some embodiments, methods herein may also comprise generating a dictionary for the current tabular log data, the dictionary having a dictionary entry for each instance of log data. In other embodiments, dictionary entries may be comprised of 5 or more of (or 4 or more of, or 3 or more of, or 2 or more of) log name, date, time, timestamp, message, category, day of the week, month of the year, success, hour of the day, minute of the hour, and/or day of the month.

According to some embodiments, methods herein may also comprise creating a dictionary for the current tabular log data, the dictionary having a dictionary entry for each instance of log data; and/or generating data in the dictionary via looping through every line of the log data and appending information regarding each said dictionary entry into the dictionary. In implementations, the raw log data may be comprised of three log types, including outbound logs, inbound logs, and batch logs.

According to some embodiments, methods herein may also comprise creating a dictionary for the current tabular log data, the dictionary having a dictionary entry for each instance of log data; and/or updating one or more string names associated with one or more dictionary entries to numerical values. Implementations herein may be configured such that updating one or more string names may comprise processing a list of dictionary entries and a category variable; looping-through a list of job names, from the one or more string names, to parse out a Business name, a Log Function name, a Business Function name, a Business Process name, and a numerical Log name; looping-through a list of Business names, correlating each said Business name to a number, and returning a first numerical value; looping-through a list of Log Function names, correlating each said Log Function name to a number, and returning a second numerical value; looping-through a list of Business Function names, correlating each said Business Function name to a number, and returning a third numerical value; looping-through a list of Business Process names, correlating each said Business Process name to a number, and returning a fourth numerical value; creating the numerical Log name via combining two or more of: the first numerical value, the second numerical value, the third numerical value, and/or the fourth numerical value together to form the numerical Log name. In one example, each numerical Log name may comprise a complete unique numerical identifier for each string name.

According to some embodiments, methods herein may also comprise updating a dictionary associated with the current tabular log data. In implementations, such updating of the dictionary may comprise processing dictionary list entries comprised of an argument field, an index field, a Dictionary List field, a Log Category field, a Business Name field, a Log Function field, a Business Function field, a Business Process field, and a Log Name field; and/or updating and adding fields comprising the Log Category field, the Business Name field, the Log Function field, the Business Function field, the Business Process field, and a Log Name to the dictionary, wherein the Log Name is a unique numerical identifier created by combining a plurality of fields into one unique value.

Figure 5B:
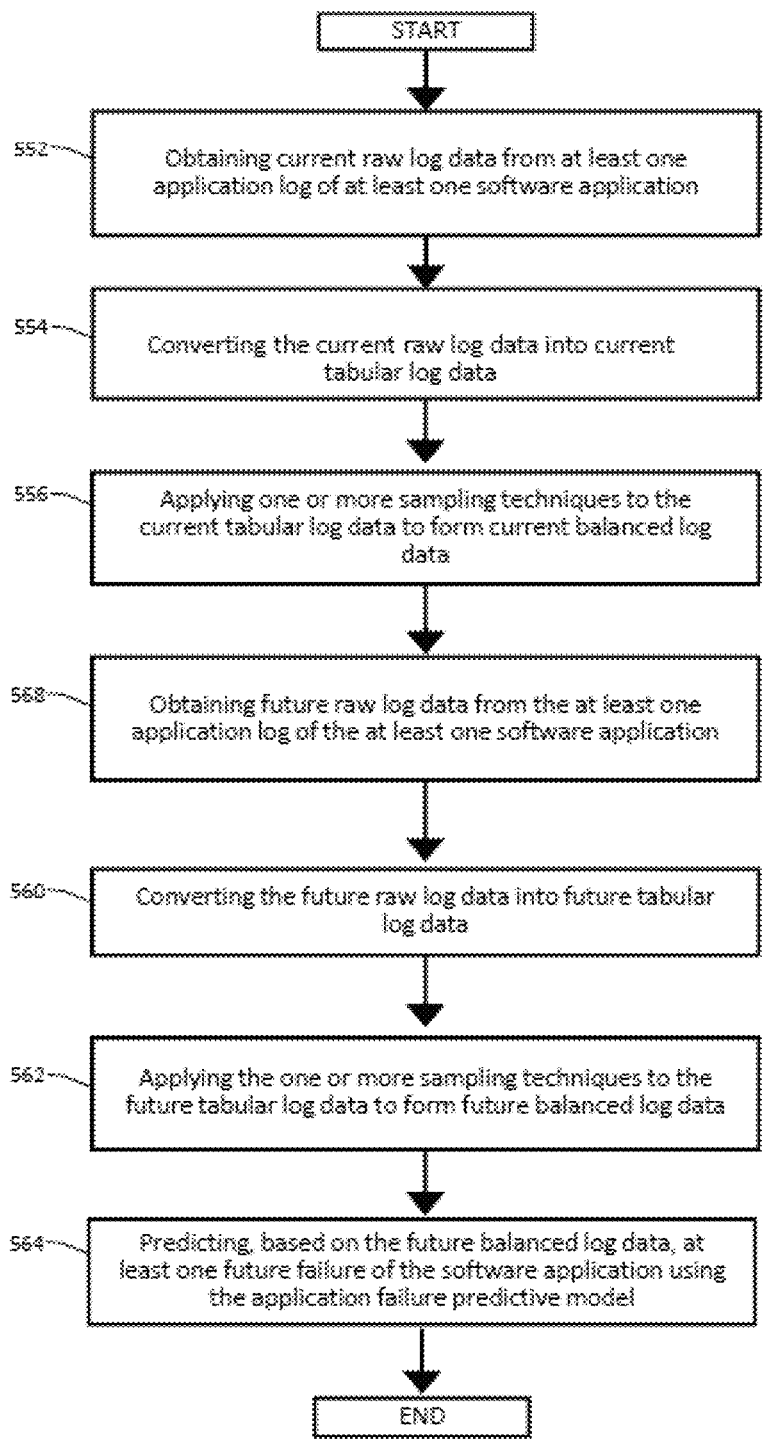

FIG. 5B is a flowchart illustrating another exemplary process 550 related to incident prediction, consistent with exemplary aspects of at least some embodiments of the present disclosure. As shown in the exemplary flowchart of FIG. 5B, an illustrative incident prediction process 550 may comprise: obtaining current raw log data from at least one application log of at least one software application, at 552; converting the current raw log data into current tabular log data, at 554; applying one or more sampling techniques to the current tabular log data to form current balanced log data, at 556; optionally, applying one or more machine learning techniques to the current balanced log data to generate an application failure predictive model (not shown); obtaining future raw log data from the at least one application log of the at least one software application, at 558; converting the future raw log data into future tabular log data, at 560; applying the one or more sampling techniques to the future tabular log data to form future balanced log data, at 562; and predicting, based on the future balanced log data, at least one future failure of the software application using the application failure predictive model, at 564.

In various embodiments, one or more of steps 552 through 564 may be performed by at least one processor. In some implementations, the current balanced log data may include incidents of failures.

Figure 5C:
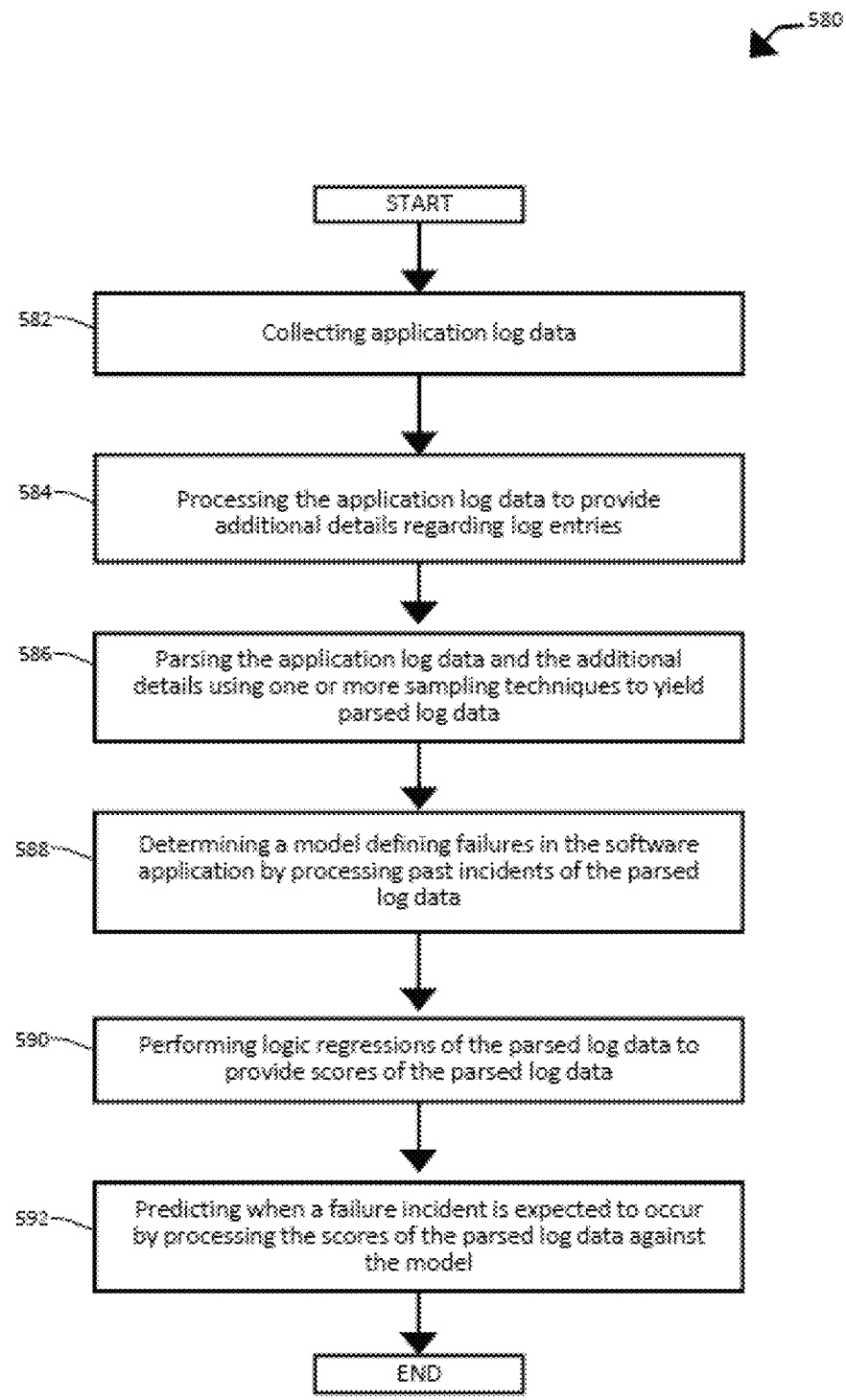

FIG. 5C is a flowchart illustrating another exemplary process 580 related to incident prediction, consistent with exemplary aspects of at least some embodiments of the present disclosure. As shown in the exemplary flowchart of FIG. 5C, an illustrative incident prediction process 580 may comprise: collecting application log data, at 582; processing the application log data to provide additional details regarding log entries, at 584; parsing the application log data and the additional details using one or more sampling techniques to yield parsed log data, at 586; determining a model defining failures in the software application by processing past incidents of the parsed log data, at 588; performing logic regressions of the parsed log data to provide scores of the parsed log data, at 590; and predicting when a failure incident is expected to occur by processing the scores of the parsed log data against the model, at 592.

In some embodiments, step 588 may comprise processing the past incidents of the parsed log data regarding one or both of: (i) one or more incidents of the failures; and/or (ii) one or more times of occurrence of the failures.

In one embodiment, such sampling techniques may comprise an undersampling technique. In various implementations, the undersampling technique may comprise parsing the tabular data into majority class data and minority class data; reducing the majority class data to a size commensurate with the size of the minority class data; and/or generating the balanced log data using the reduced-size majority class data and the minority class data.

Various other features, functionality, and/or steps herein, including but not limited to those discussed in association with FIG. 5A, may be performed in connections with FIGS. 5B and 5C.

Figure 6A:
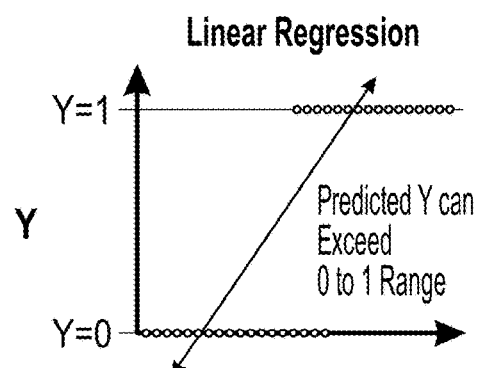
FIGS. 6A-6B illustrate charts depicting exemplary regression operations of an exemplary incident prediction process, consistent with exemplary aspects of certain embodiments of the present disclosure.
Figure 6B:
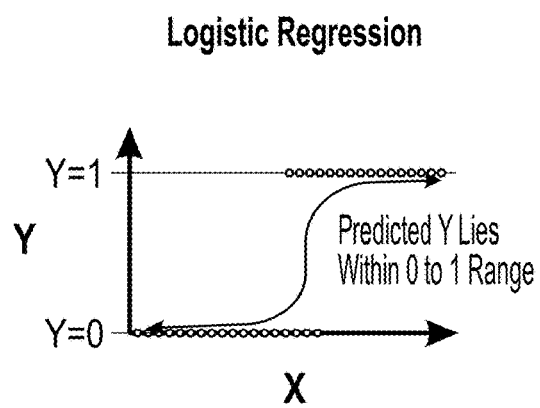

FIGS. 6A-6B illustrate charts depicting exemplary regression operations of an exemplary incident prediction process, consistent with exemplary aspects of certain embodiments of the present disclosure. Regression involves statistical analysis associated with determining the relationship between one dependent variable (y) and one or more independent variables (x). One or more regression models may be utilized in connection with embodiments herein, such as linear regression model, logistic regression model, support vector machine model, a classifier system, a decision trees, and the like. For example, a linear regression model can be used to determine the relationship of x and y with a straight line fitting to the data. A logistic regression model may be used in prediction, not to determine a precise numerical value of a dependent variable, but rather the probability that it is one instead of zero. A logistic regression model may be more suitable when the dependent variable is a dichotomy. For example, a logistic regression model can be used to determine relationships between at least one dependent variable of the current balanced log data and one or more independent variables of the current balanced log data. As shown herein FIG. 6B, a logistic regression model is generated trained with the processed log data. For example, in the above-described anomaly detection phase, timestamped data can be used to create a benchmark to train the logistic regression model with what log data content reflects normal operation of a software application. As shown herein FIG. 6B, the x variables along the X-axis represent input log data, and the determined respective predicted y variables along the Y-axis represent a probability that there is an incident of failure, the y variable ranging between 0 and 1. When a linear regression model is used as shown in FIG. 6A, the x variables along the X-axis similarly represent input log data, and the determined respective predicted y variables along the Y-axis represent a probability that there is an incident of failure, the y variable not being limited to the 0 to 1 range.

Figure 6C:
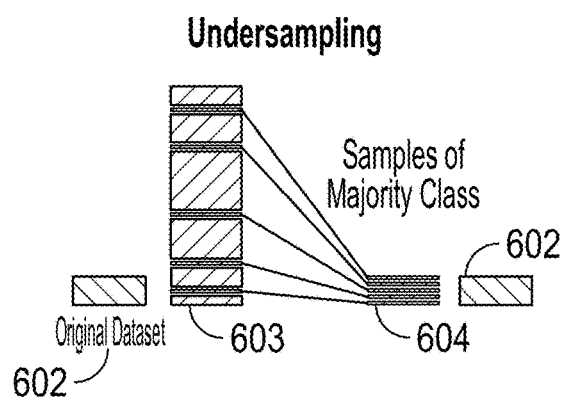
FIGS. 6C-6D illustrate charts depicting exemplary sampling operations of an exemplary incident prediction process, consistent with exemplary aspects of certain embodiments of the present disclosure.
Figure 6D:
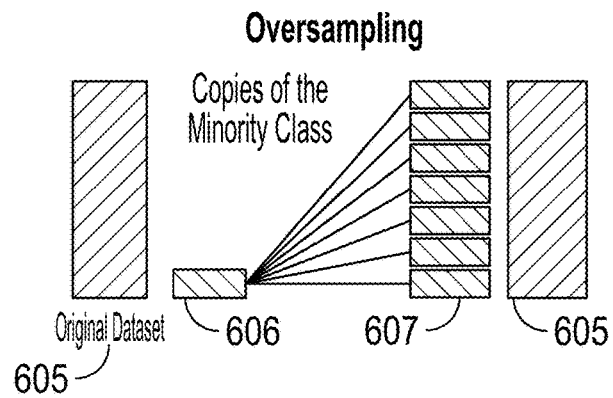

FIGS. 6C-6D illustrate charts depicting exemplary sampling operations of an exemplary incident prediction process, consistent with exemplary aspects of certain embodiments of the present disclosure. Various sampling techniques can be applied for balancing an imbalanced training data. For example, undersampling (FIG. 6C), oversampling (FIG. 6D), or a combination thereof can be used to adjust the class distribution of data (e.g., the ratio between the different classes/categories represented within the data). Undersampling removes data in the majority class of the training data to balance the data; while oversampling supplements data in the majority class of the training data based on data in the minority class to balance the data. As shown herein FIG. 6C, an exemplary original dataset (e.g., training log data) includes both a minority class of data 602, and a majority class of data 603. With the application of under-sampling techniques, the majority class of data 603 is balanced (in this case, reduced) to a majority class of data 604. As depicted herein with the respective heights of bars, the balanced dataset now has a majority class of data 603 with a size that is similar to that of the minority class of data 602.

On the other hand, as shown in FIG. 6D, oversampling techniques balance the training data in the opposite manner. As shown herein FIG. 6D, an exemplary original dataset (e.g., training log data) includes both a minority class of data 606, and a majority class of data 605. With the application of oversampling techniques, the minority class of data 606 is balanced (in this case, supplemented) to a minority class of data 607. Again, as depicted herein with the respective heights of bars, the balanced dataset now has a minority class of data 607 with a size that is similar to that of the majority class of data 605.

In some embodiments, the application log data is parsed to generate additional details using one or more sampling techniques to yield parsed log data. A logistic regression is applied on the parsed log data to determine scores of the parsed log data. In one example, the sampling techniques include under-sampling. In implementations, undersampling may include parsing the tabular log data into majority class data and minority class data; and reducing the majority class data to a size commensurate with the size of the minority class data. Based on the reduced-size majority class data and the minority class data, the undersampling process generates the balanced log data. Then, the predictive model is used to predict when a failure incident is expected to occur by processing the scores of the parsed log data against the predictive model.

In some embodiments, sampling techniques are applied to all of the processed log data. For example, the following portions of code illustrate an application of random under-sampling followed by a random oversampling to the log data. In some embodiments, this and other sample code portions and functions herein may be based on the scikit-learn package (See, e.g. Scikit-learn: Machine Learning in Python, Pedregosa et al., JMLR 12, pp. 2825-2830, 2011, with reference to linear models, logistic regression within the linear model library, etc., i.e., in Scikit-learn versions 0.23.dev0, 0.22.2, and prior).

```
# Creating X and Y values and dropping what is in the Y from X which is Success
X = data.drop('success',axis=1)
Y = data['success']
# Random Undersampling
rus = RandomUnderSampler ('majority')
X_resampled, y_resampled = rus.fit_resample(X, y)
# Random Over sampler
# from imblearn.over_sampling import RandomOverSampler
# ros = RandomOverSampler ('minority')
#X_res, y_res = ros.fit_resample(x_resampled, y_resampled)
X = x_resampled
```

In some embodiments, the resampled log data is further split into a training dataset and/or a testing data set. The testing dataset can be used to verify and validate/modify the prediction results of the predictive model. For example, the following code shows an operation of such sample data splitting:

```
# Sets up the Training data verse test data
x_train, x_test, y_train, y_test = train_test_split(X,y,
test_size=0.3,
random_state=0)
```

In some embodiments, the predictive model is configured to apply a LASSO regression model. As shown in the following portion of code, a function of LogisticRegression takes input of a solver value and a penalty value, an indication that the sample data is now balanced, an indication that there are multiple classifications, and returns a logistic model. Next, the logistic model is trained with the balanced training dataset only. Subsequently, prediction results are generated by a function of predict, which takes input of the log data (x variable) of the testing dataset. Then, another function (e.g., roc_auc_score, in the example discussed herein) is invoked to take input of both the prediction results (y variable) of the testing dataset, and the prediction results generated by the logistic model, and returns an accuracy score measuring the performance of the prediction model. Similarly, a set of false positive rate, a true positive rate, one or more thresholds may be computed using a function of roc_curve, which takes input of, again, the prediction results (y variable) of the testing dataset, and results of the respective prediction rate generated by a function of predict_proba, e.g:

```
Logmodel = LogisticRegression(solver='saga',penalty='l1',
class_weight=
'balanced', multi_class= 'multinomial')
logmodel.fit(X_train,y_train)
predictions = logmodel.predict(X_test)
logit_roc_auc = roc_auc_score(y_test, logmodel.predict(X_test))
fpr, tpr, thresholds = roc_curve(y_test,
logmodel.predict_proba(X_test)[:,1])
```

Figures 6E, 6F, 6G:
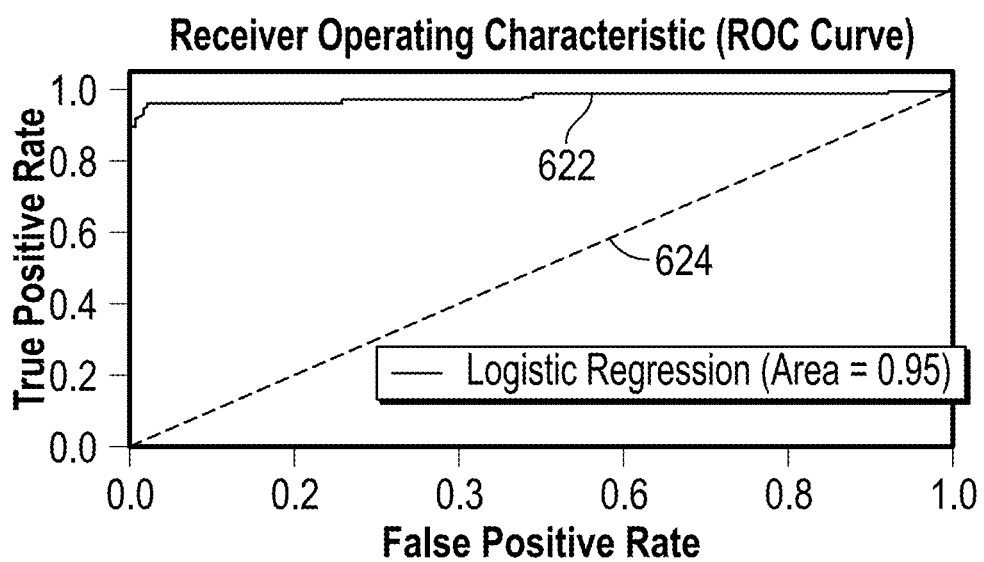
FIG. 6E illustrates a diagram depicting an exemplary coding operations of an exemplary incident prediction process, consistent with exemplary aspects of certain embodiments of the present disclosure.
FIG. 6F illustrates a diagram depicting an exemplary confusion matrix of an exemplary incident prediction process, consistent with exemplary aspects of certain embodiments of the present disclosure.
FIG. 6G illustrates a chart depicting an exemplary AUC-ROC curve of an exemplary incident prediction process, consistent with exemplary aspects of certain embodiments of the present disclosure.

FIG. 6E illustrates an exemplary coding operation of an exemplary incident prediction process, consistent with exemplary aspects of certain embodiments of the present disclosure. According to some embodiments, encoding techniques may be applied to tabular log data for further processing. In one embodiment, the encoding technique of "one-hot encoding" can be applied to the tabular log data for conversion into a format that is better-suited and/or more efficient for training a machine learning model. Here, for example, as shown in FIG. 6E, beginning on the left-hand side, a collection of tabular data is depicted to include three categories (e.g., features) of "company name," "categorical value," and "price." Correspondingly, four rows of data are depicted with respect to the three categories. Upon the application of the one-hot encoding process (depicted via the arrow), the same collection of data is encoded and represented in an encoded form. As shown herein, the company names are used as categories along with the previous category of "price," and each row of data is labeled according to the new set of categories. For example, the first row of data 612 of the collection on the left-hand side is transformed into the first row 614 of the collection on the right-hand side, indicating a state of being related to company "VW" (e.g., the value of one out of the binary encoding), and a state of not being related to either "Acura" or "Honda" (e.g., the values of zero out of the binary encoding).

FIG. 6F illustrates an exemplary confusion matrix that may be part of an exemplary incident prediction process, consistent with exemplary aspects of certain embodiments of the present disclosure. In some embodiments, in order to evaluate model performance, the predicted values (e.g., prediction results) of the predictive model are categorized into four groups: true positive (TP), false positive (FP), false negative (FN), and true negative (TN). As shown herein, in the TP quadrant the predictive model correctly identifies a true incident as a predicted incident, with both the predicated value along the Y axis and the actual value along the X axis indicating positive. In the FP quadrant, the predictive model falsely identifies a predicted incident, with the predicated value along the Y axis indicating positive but the actual value along the X axis indicating negative. In the FN quadrant, the predictive model fails to identify a true incident as a predicted incident, with the predicated value along the Y axis indicating negative but the actual value along the X axis indicating positive. In the TN quadrant, the predictive model correctly identifies no predicted incident, with both the predicated value along the Y axis and the actual value along the X axis indicating negative.

In some embodiments, a $F_1$ score can be computed to assess a balance between a degree of precision and a degree of recall, using the predictive model. According to various implementations, a $F_1$ score can be computed by a harmonic mean of the precision rate and a recall rate. In some examples, a precision rate can be implemented as a performance metric of the trained predictive model. A precision rate can measure a rate of the total number of positive predictions in relation to the positive predictions that are correctly rendered. For example, a precision rate can be computed by dividing the number of true positives (TP) by the sum of the number of true positives (TP) and the number of false positives (FP).

In some other embodiments, a recall rate can be implemented as another performance metric of the trained predictive model. A recall rate can measure a model's performance in terms of false negatives. A recall rate can be computed by dividing the number of true positives (TP) by the sum of the number of true positives (TP) and the number of false negatives (FN).

In implementations, a function of confusion_matrix can be configured to take inputs of both y_test and predictions, and return a confusion matrix of array (fill in). Further, a function of metrics.accuracy_score can be configured to take inputs of both the y_test and predictions to return a score ranging between 0 and 1. One illustrative example of such a confusion matrix function is:

```
confusion_matrix(y_test,predictions)
array([[344, 3],
       [ 31, 305]])
metrics.accuracy_score(y_test, predictions)
0.9502196193265008
```

In some embodiments, a confusion matrix may be utilized to measure how accurate the predictive model is in terms of making accurate predictions of incidents of failure. In practice, the goal should be to generate a model that produces a minimal number of, if not zero number of, false positives and/or false negatives. When applied in, for example, the cycling stage 409 of FIG. 4, the confusion matrix can be used to gauge the performance of the model generated upon every iteration of training and refinement.

FIG. 6G illustrates an exemplary area under the curve (AUC)—receiver operating characteristic (ROC) of an exemplary incident prediction process, consistent with exemplary aspects of certain embodiments of the present disclosure. In some embodiments, the performance of a predictive model can also be measured using an AUC-ROC technique, which provides an aggregated measurement across classifications. As shown herein FIG. 6G, an AUC value can be identified as a false positive rate along the X axis, and a true positive rate along the Y axis. As such, a AUC value ranges between 0 and 1, with the value of zero indicating that all the predication generated by the model are wrong, and the value one indicating that all of the predications generated by the model are correct. The goal with this measurement is to approximate the ideal condition where zeros are predicted as zeros, and ones are predicted as ones (as shown in the dotted line 624). Here, the performance metric associated with the logistic regression model is shown in a solid line 622, showing a range of a true positive rate of about 70%, and a false positive rate of about 90%.

The following illustrates an exemplary incident prediction process in pertinent exemplary code. As shown below, in the beginning, raw log data is processed via the following operations to generate tabular log data:

In [37]:

```
futureData = pd.read_csv("./CMS-FutureDates.csv")
futureData.set_index("unix_time", inplace = True)
date = futureData['date']
df = futureData
futureData = futureData.drop(columns=['log_name', 'categories', 'time', 'date', 'message'])
futureData = pd.get_dummies (data=futureData, colums=['Log_Name', 'Log_category', 'Business_Name', 'Log_Function', 'Business
cols_to_use = [i for i in list(data.colums) if i not in list(futureData.colums) ]
futureData = pd.concat([futureData,pd.DataFrame(colums=list(cols_to_use))], sort=False)
futureData.fillna(0, inplace=True)
futureData.head( )
```

Out [37]:

|  | day_of_week | month_of_year | success | hour_of_day | minute_of_hour | day_of_month |
|---|---|---|---|---|---|---|
| 1542760500 | 3.0 | 11.0 | 0.0 | 0.0 | 35.0 | 21.0 |
| 1543278180 | 2.0 | 11.0 | 0.0 | 0.0 | 23.0 | 27.0 |
| 1543882920 | 2.0 | 12.0 | 0.0 | 0.0 | 22.0 | 4.0 |
| 1545357300 | 5.0 | 12.0 | 0.0 | 1.0 | 55.0 | 21.0 |
| 1542760500 | 3.0 | 11.0 | 0.0 | 0.0 | 35.0 | 21.0 |

|  | log_Name_3100002 | log_Name_3100006 | log_category_3 | Business |
|---|---|---|---|---|
| 1542760500 | 1.0 | 0.0 | 1.0 | |
| 1543278180 | 1.0 | 0.0 | 1.0 | |

-continued

|  |  |  |  |
|---|---|---|---|
| 1543882920 | 1.0 | 0.0 | 1.0 |
| 1545357300 | 1.0 | 0.0 | 1.0 |
| 1542760500 | 0.0 | 1.0 | 1.0 |

5 rows × 148 columns

Then, a prototype prediction model is generated using one or more sets of benchmark log data indicating the lack of anomaly in execution, e.g.:

In [38]:

```
Y = futureData['success']
futureData = futureData.drop('success',axis=1)
fpredictions = logmodel.predict(futureData)
futureData['Error Predictor'] = fpredictions
futureData['Date'] = date
# futureData['Error Predictor'] = futureData.loc[futureData['Error Predictor'] == 1] = 'Predicted No Error'
# futureData['Error Predictor'] = futureData.loc[futureData['Error Predictor'] == 0] = 'Predicted Error'
futureData[['Date', 'Error Predictor']].head(8)
```

Out[38]:

|  | Date | Error Predictor |
|---|---|---|
| 1542760500 | Nov. 21, 2018 | 0 |
| 1543278180 | Nov. 27, 2018 | 0 |
| 1543882920 | Dec. 4, 2018 | 0 |
| 1545357300 | Dec. 21, 2018 | 0 |
| 1542760500 | Nov. 21, 2018 | 0 |
| 1543278180 | Nov. 27, 2018 | 0 |
| 1543882920 | Dec. 4, 2018 | 0 |
| 1545357300 | Dec. 21, 2018 | 0 |

Next, performance metrics are generated to measure the performance of the predictive model.
In [39]: Confusion_matrix(Y,fpredictions)
Out[39]: array([[8]])
In [40]:

```
futureData['Error Predictor'] = ['Predicted No Error' if x == 1 else 'Predicted Error' for x in futureData['Error Pred
futureData[['Date', 'Error Predictor']].head(8)
```

Out [40]:

|  | Date | Error Predictor |
|---|---|---|
| 1542760500 | Nov. 21, 2018 | Predicted Error |
| 1543278180 | Nov. 27, 2018 | Predicted Error |
| 1543882920 | Dec. 4, 2018 | Predicted Error |
| 1545357300 | Dec. 21, 2018 | Predicted Error |
| 1542760500 | Nov. 21, 2018 | Predicted Error |
| 1543278180 | Nov. 27, 2018 | Predicted Error |
| 1543882920 | Dec. 4, 2018 | Predicted Error |
| 1545357300 | Dec. 21, 2018 | Predicted Error |

In [41]:

```
Date = futureData['Date']
error = futureData['Error Predictor']
futureData = futureData.drop('Date',axis=1)
futureData = futureData.drop('Error Predictor', axis=1)
pPredictions = logmodel.predict_proba(futureData)[:,0]
print(pPredictions)
[0.8354774 0.60631729 0.62815775 0.97956101 0.8354774 0.60631729 0.62815775 0.97956101]
```

Lastly, the predictive model is updated and retrained, the updated model being configured to predict errors with a computed confidence score, e.g.:

In [42]:

```
newdf = pd.DataFrame(df.log_name)
newdf['date'] = date
newdf['Error Prediction'] = error
pPredictions = [x*100 for x in pPredictions]
newdf['Confidence in Prediction of Error'] = pPredictions
newdf.head(8)
```

Out [42]:

| Unix_time | log_name | date | Error Predictor | Confidence in Prediction of Error |
|---|---|---|---|---|
| 1542760500 | JOBS.STSV.CMS_TRPL_PNT_INSERT | Nov. 21, 2018 | Predicted Error | 83.547740 |
| 1543278180 | JOBS.STSV.CMS_TRPL_PNT_INSERT | Nov. 27, 2018 | Predicted Error | 60.631729 |
| 1543882920 | JOBS.STSV.CMS_TRPL_PNT_INSERT | Dec. 4, 2018 | Predicted Error | 62.815775 |
| 1545357300 | JOBS.STSV.CMS_TRPL_PNT_INSERT | Dec. 21, 2018 | Predicted Error | 97.956101 |
| 1542760500 | JOBS.STSV.CMS_TRPL_PNT_INSERT | Nov. 21, 2018 | Predicted Error | 83.547740 |
| 1543278180 | JOBS.STSV.CMS_TRPL_PNT_INSERT | Nov. 27, 2018 | Predicted Error | 60.631729 |
| 1543882920 | JOBS.STSV.CMS_TRPL_PNT_INSERT | Dec. 4, 2018 | Predicted Error | 62.815775 |
| 1545357300 | JOBS.STSV.CMS_TRPL_PNT_INSERT | Dec. 21, 2018 | Predicted Error | 97.956101 |

Figure 7:
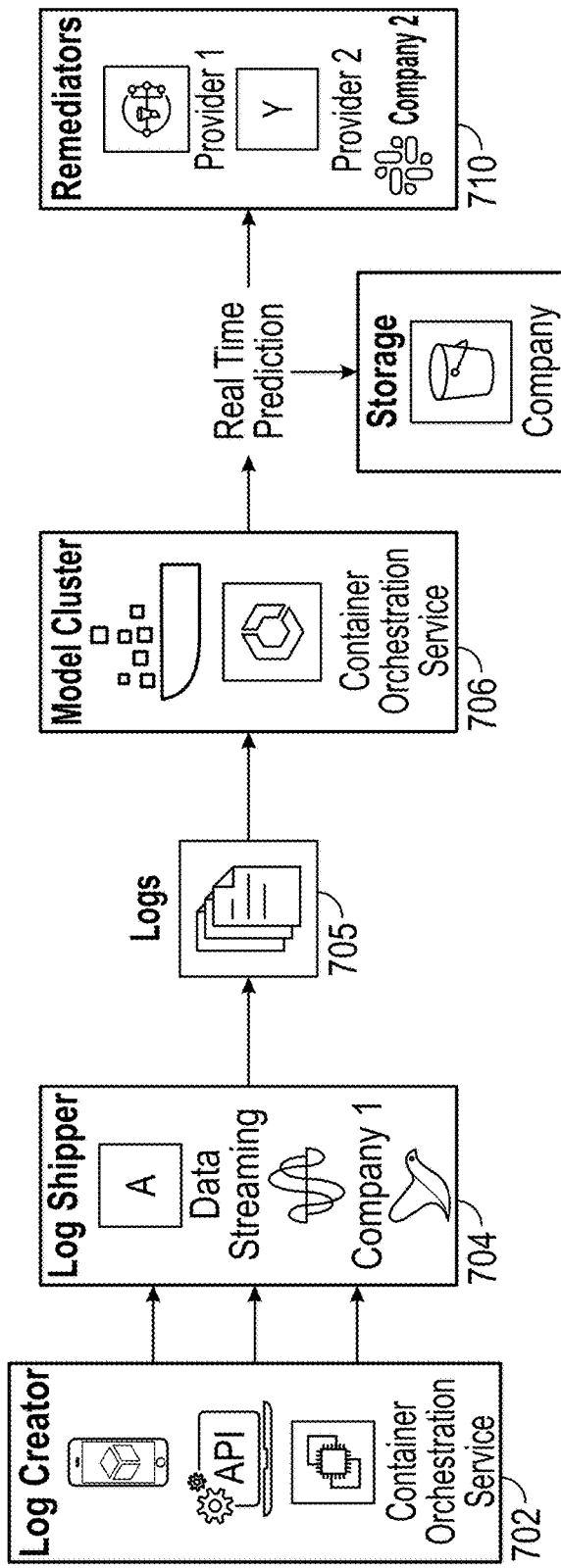
FIG. 7 illustrates a diagram of an exemplary incident predicting process, consistent with exemplary aspects of certain embodiments of the present disclosure.

FIG. 7 illustrates a diagram of an exemplary incident predicting process, consistent with exemplary aspects of certain embodiments of the present disclosure. In some embodiments, an incident prediction process can be applied in real time to predict future incidents. For example, a log creator 702 is configured to generate various log data during the course of one or more software applications being executed. The log creator 702 may be an application running on an individual client device, or a service hosted at a cloud platform. Next, a log shipper 704 is configured to collect and compile the logs from the log creator 702 to generate application logs 705. Upon furnishing the application logs (e.g., future log data) to a model cluster 706 which implements the above-described incident prediction, the trained predictive model of the model cluster 706 is configured to make real time predictions of incidents of failures. In some embodiments, the real-time prediction results are further stored at a storage 708. In some other embodiments, the real-time prediction results are provided to remediator 710 such that one or more remedial actions can be performed in response to the predicted future failure(s). According to embodiments herein, the remediator 710 may be a computer system or platform configured to facilitate remediation of the failure, e.g., a component that communicates with those who need to be informed, once a failure is generated via the prediction, such as a component (e.g., from one or more providers such as SNS, Lambda, etc.) that generates a message stating that the application has failed at a specific place. In some embodiments, a remedial action performed via remediator 710 may also include generating communications to instruct a computer processor to cease execution of one or more applications or routines likely leading to the predicted failure, or to recover a previous version of the software application, or to have the failure automatically corrected. Here, by way of example and not limitation, if the application failed because a server was down, then the remedial action may comprise instruction(s) to restart the server.

Figure 8:
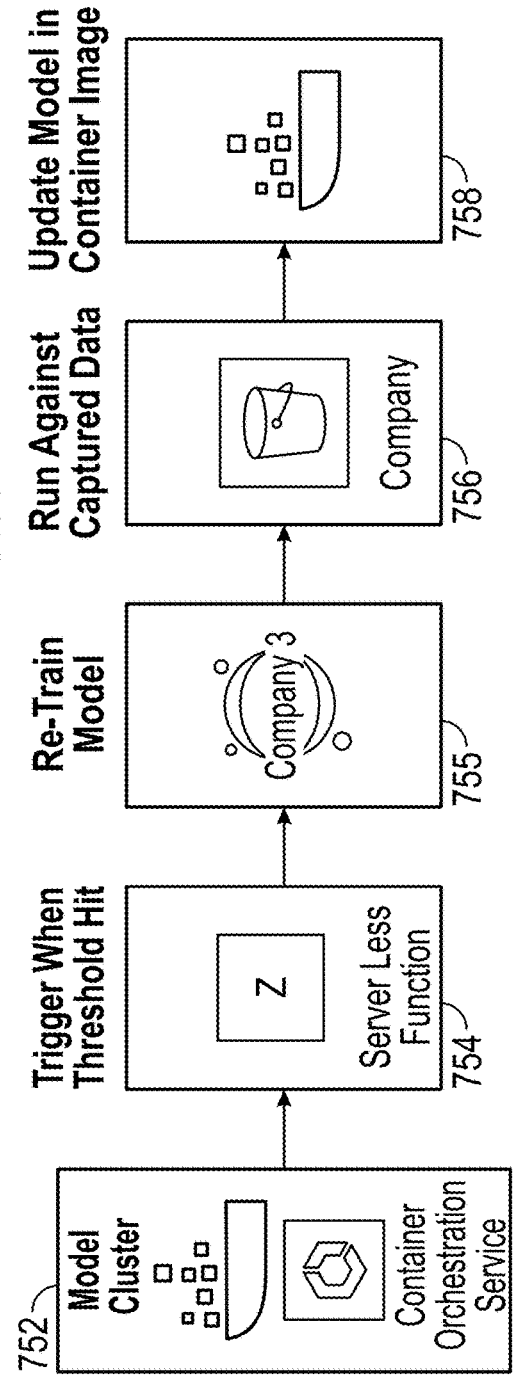
FIG. 8 illustrates a diagram of another exemplary incident predicting process, consistent with exemplary aspects of certain embodiments of the present disclosure.

FIG. 8 illustrates a diagram of another exemplar incident predicting process, consistent with exemplary aspects of certain embodiments of the present disclosure. In some embodiments, reinforcement learning can be applied to the incident prediction process. As shown here, starting with operation of a model cluster 752, a trigger is invoked when a threshold value is reached, at 754, such that the triggering criteria is communicated to the model cluster. With the triggering information, the predictive model is retrained, at 755, to modify or otherwise update the predictive model. Subsequently, the captured data is applied, at 756, to the updated model, which is updated and in turn stored in a container image of the model cluster, at 758.

Figure 9:
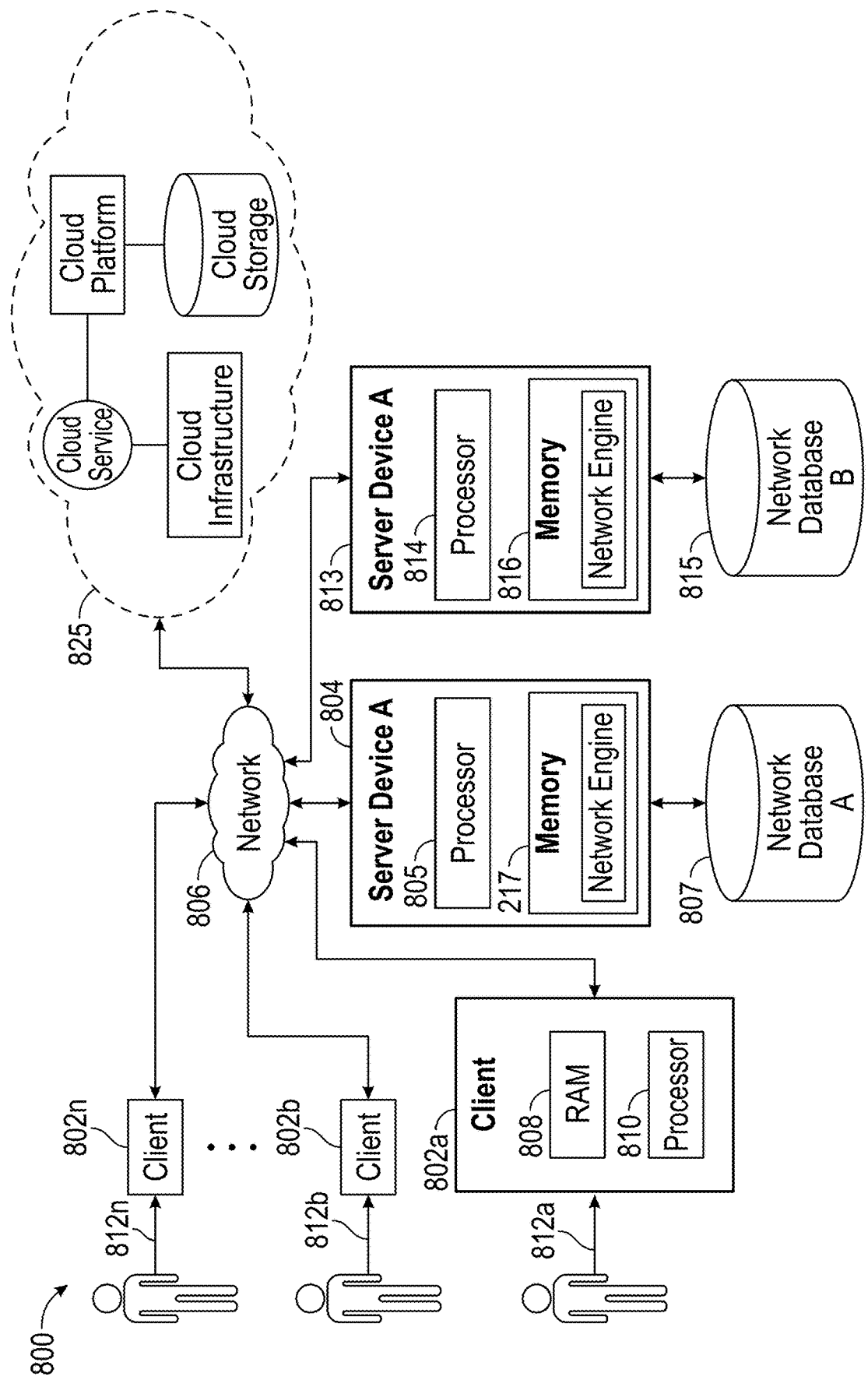
FIG. 9 is a block diagram depicting another exemplary computer-based system and/or platform, in accordance with certain embodiments of the present disclosure.

FIG. 9 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 802a, 802b through 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806. As shown in FIG. 8, exemplary server devices 804 and 813 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
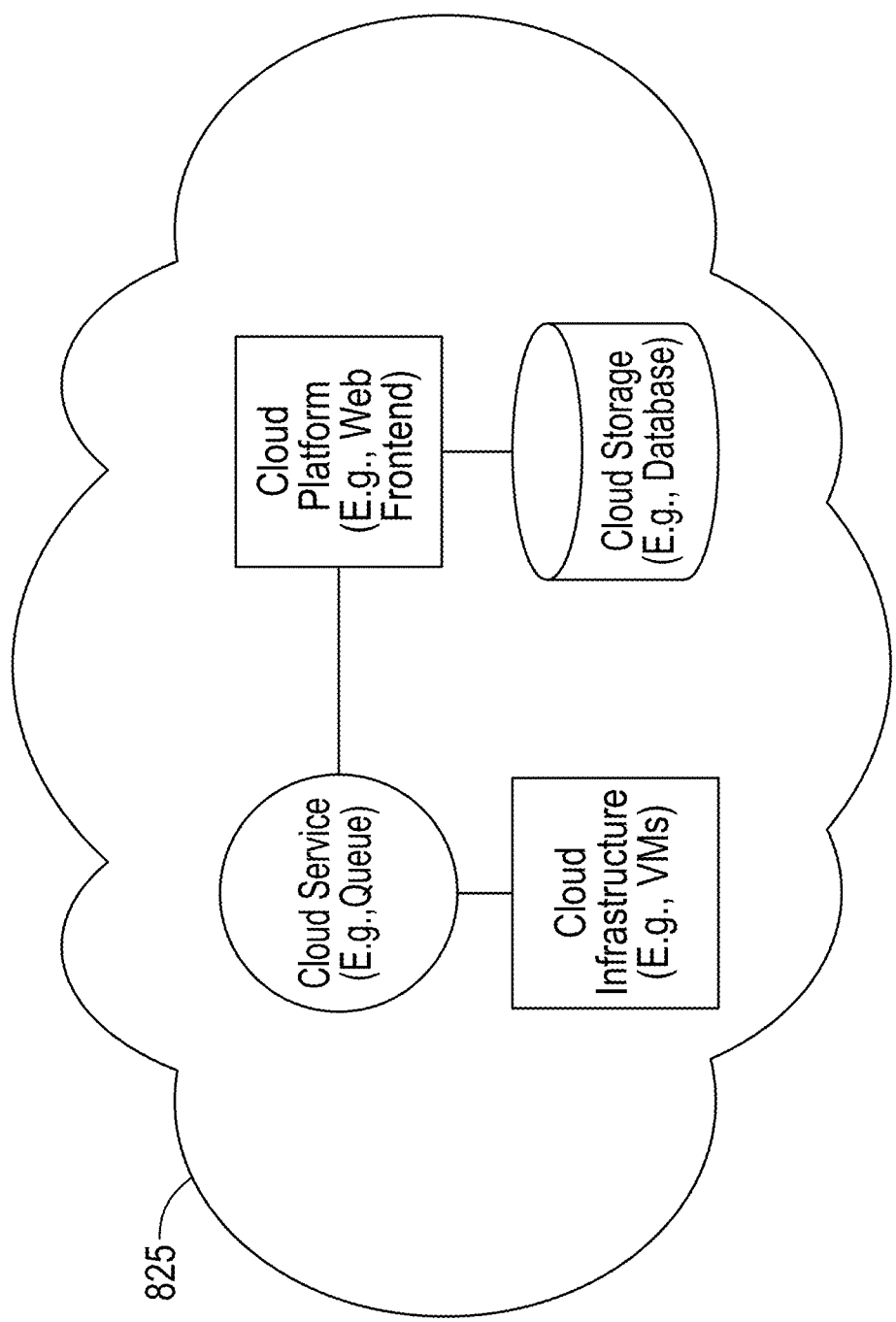
FIGS. 10 and 11 are diagrams illustrating two exemplary implementations of cloud computing architecture/aspects with respect to which the disclosed technology may be specifically configured to operate, in accordance with certain embodiments of the present disclosure.

As also shown in FIGS. 9 and 10, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 11:
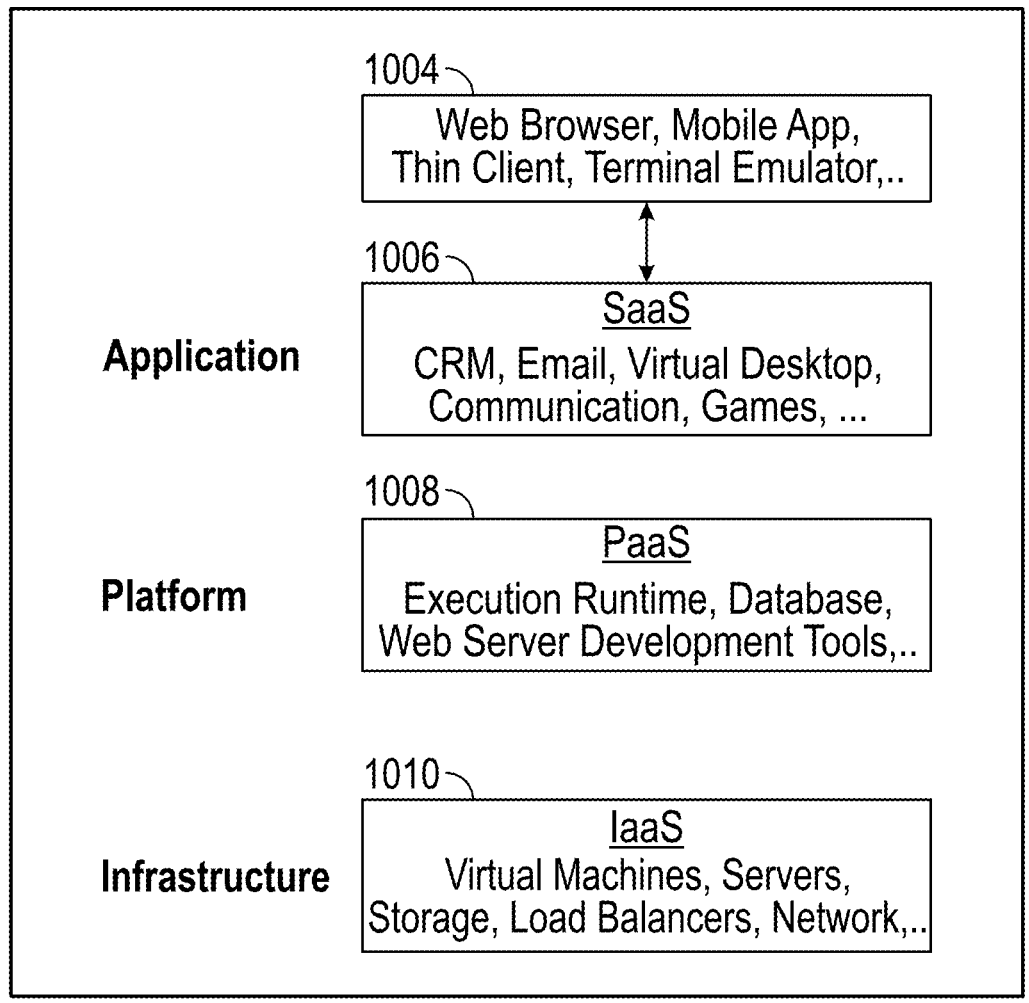

According to some embodiments shown by way of one example in FIG. 11, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 10 and 11 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, e.g. as shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and the term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., as shown in FIGS. 9-11) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) Linux, (2) Microsoft Windows, (3) OS X (Mac OS), (4) Solaris, (5) UNIX (6) VM, (7) Android, (8) Java Platforms, (9) Open Web Platform, or other suitable computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
obtaining, by at least one processor, current raw log data from at least one application log of at least one software application;
converting, by the at least one processor, the current raw log data into current tabular log data;
applying, by the at least one processor, one or more sampling techniques to the current tabular log data to form current balanced log data, wherein the current balanced log data includes previous incidents of failures of the at least one software application;
applying, by the at least one processor, one or more machine learning techniques to the current balanced log data to generate an application failure predictive model based at least in part on the previous incidents of failures of the at least one software application;
generating, by the at least one processor, at least one indication of at least one future failure of the software application based on future balanced log data and the application failure predictive model; and
causing, by the at least one processor, based on the at least one indication, at least one remedial activity to be performed to or with the software application to mitigate or avoid the at least one future failure of the software application.

Clause 2. The method of clause 1 or any clause herein, wherein the one or more sampling techniques comprise an undersampling technique.

Clause 3. The method of clause 2 or any clause herein, wherein the undersampling technique comprises:
parsing the current tabular log data into majority class data and minority class data;
reducing the majority class data to a size commensurate with the size of the minority class data; and
generating the current balanced log data using the reduced-size majority class data and the minority class data.

Clause 4. The method of clause 1 or any clause herein, wherein applying the one or more machine learning techniques to the current balanced log data comprises utilizing logistic regression to determine relationships between at least one dependent variable of the current balanced log data and one or more independent variables of the current balanced log data.

Clause 5. The method of clause 4 or any clause herein, wherein the logistic regression comprises a least absolute shrinkage and selection operator (LASSO) logistic regression that performs variable selection and regularization of the current balanced log data.

Clause 6. The method of clause 1 or any clause herein, further comprising:
splitting the current balanced log data into training data and testing data, wherein the training data and the testing data are utilized to verify the model's integrity.

Clause 7. The method of clause 1 or any clause herein, wherein the applying the one or more sampling techniques to the current tabular log data comprises one hot encoding the current tabular log data.

Clause 8. The method of clause 1 or any clause herein, further comprising:
configuring the tabular data into a readable tabular format, wherein one or both of the applying the one or more sampling techniques and/or the applying the one or more machine learning techniques are performed on the readable tabular format of the tabular data.

Clause 9. The method of clause 8 or any clause herein, wherein the configuring the tabular data into the readable tabular format comprises generating a dictionary and fields that provide additional details regarding the log data, wherein the dictionary and fields are stored with the readable tabular format of the tabular data in a virtual Python environment.

Clause 10. The method of clause 8 or any clause herein, further comprising:

generating a dictionary for the current tabular log data, the dictionary comprising a dictionary list and dictionary entries for each element of log data.

Clause 11. The method of clause 10 or any clause herein, further comprising, in connection with configuring the tabular data into the readable tabular format:

returning a dictionary list;

scanning a row of the dictionary list to generate keys that are used as column headers for in the readable tabular format;

writing, to a CSV file, the keys that correspond to the column headers; and writing rows from the dictionary list to fill the CSV file.

Clause 12. The method of clause 1 or any clause herein, further comprising:

transforming the raw log data into a readable format; and generating input date, time, logType, and message fields for each instance of the transformed raw log data.

Clause 13. The method of clause 1 or any clause herein, further comprising:

generating a dictionary for the current tabular log data, the dictionary having a dictionary entry for each instance of log data, wherein dictionary entries are comprised of 5 or more of log name, date, time, timestamp, message, category, day of the week, month of the year, success, hour of the day, minute of the hour, and/or day of the month.

Clause 14. The method of clause 1 or any clause herein, further comprising:

creating a dictionary for the current tabular log data, the dictionary having a dictionary entry for each instance of log data; and generating data in the dictionary via looping through every line of the log data and appending information regarding each said dictionary entry into the dictionary.

Clause 15. The method of clause 14 or any clause herein, wherein the raw log data is comprised of three log types, including outbound logs, inbound logs, and batch logs.

Clause 16. The method of clause 1 or any clause herein, further comprising:

creating a dictionary for the current tabular log data, the dictionary having a dictionary entry for each instance of log data;

updating one or more string names associated with one or more dictionary entries to numerical values, including:

processing a list of dictionary entries and a category variable;

looping-through a list of job names, from the one or more string names, to parse out a Business name, a Log Function name, a Business Function name, a Business Process name, and a numerical Log name;

looping-through a list of Business names, correlating each said Business name to a number, and returning a first numerical value;

looping-through a list of Log Function names, correlating each said Log Function name to a number, and returning a second numerical value;

looping-through a list of Business Function names, correlating each said Business Function name to a number, and returning a third numerical value;

looping-through a list of Business Process names, correlating each said Business Process name to a number, and returning a fourth numerical value; and creating the numerical Log name via combining two or more of the first numerical value, the second numerical value, the third numerical value, and the fourth numerical value together to form the numerical Log name, wherein each said numerical Log name comprises a complete unique numerical identifier for each string name.

Clause 17. The method of clause 1 or any clause herein, further comprising updating a dictionary associated with the current tabular log data, including:

processing dictionary list entries comprised of an argument field, an index field, a Dictionary List field, a Log Category field, a Business Name field, a Log Function field, a Business Function field, a Business Process field, and a Log Name field; and updating and adding fields comprising the Log Category field, the Business Name field, the Log Function field, the Business Function field, the Business Process field, and a Log Name to the dictionary, wherein the Log Name is a unique numerical identifier created by combining a plurality of fields into one unique value.

Clause 18. A computer-implemented method comprising:

obtaining, by at least one processor, current raw log data from at least one application log of at least one software application;

converting, by the at least one processor, the current raw log data into current tabular log data;

applying, by the at least one processor, one or more sampling techniques to the current tabular log data to form current balanced log data, wherein the current balanced log data includes incidents of failures;

applying, by the at least one processor, one or more machine learning techniques to the current balanced log data to generate an application failure predictive model;

obtaining, by at least one processor, future raw log data from the at least one application log of the at least one software application;

converting, by the at least one processor, the future raw log data into future tabular log data;

applying, by the at least one processor, the one or more sampling techniques to the future tabular log data to form future balanced log data; and predicting, by the at least one processor and based on the future balanced log data, at least one future failure of the software application using the application failure predictive model.

Clause 19. A method for predicting failure of a software application, the method comprising:

collecting application log data;

processing the application log data to provide additional details regarding log entries;

parsing the application log data and the additional details using one or more sampling techniques to yield parsed log data;

determining a model defining failures in the software application by processing past incidents of the parsed log data regarding: (i) one or more incidents of the failures, (ii) one or more times of occurrence of the failures, or (iii) both;

performing logic regressions of the parsed log data to provide scores of the parsed log data; and predicting when a failure incident is expected to occur by processing the scores of the parsed log data against the model.

Clause 20. The method of clause 19 or any clause herein, wherein the one or more sampling techniques comprise an undersampling technique, and the undersampling technique comprises:

parsing the tabular data into majority class data and minority class data;
reducing the majority class data to a size commensurate with the size of the minority class data; and
generating the balanced log data using the reduced-size majority class data and the minority class data.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
converting, by at least one processor, current raw log data from or associated with at least one application log of at least one software application into current tabular log data;
configuring the current tabular data into a readable tabular format, via:
returning a dictionary list;
scanning a row of the dictionary list to generate keys that are used as column headers in the readable tabular format;
writing, to a comma-separated value (CSV) file, the keys that correspond to the column headers; and
writing rows from the dictionary list to fill the CSV file;
applying, by the at least one processor, one or more sampling techniques to the current tabular log data to form current balanced log data, wherein the current balanced log data includes previous incidents of failures of the at least one software application;
applying, by the at least one processor, one or more machine learning techniques to the current balanced log data to generate an application failure predictive model based at least in part on the previous incidents of failures of the at least one software application;
wherein one or both of the applying the one or more sampling techniques and/or the applying the one or more machine learning techniques are performed on the current tabular log data;
generating, by the at least one processor, at least one indication of at least one future failure of the software application based on one or both of future balanced log data and/or the application failure predictive model; and
causing, by the at least one processor, based on the at least one indication, at least one remedial activity to be performed to or with the software application to mitigate or avoid the at least one future failure of the software application.

2. The method of claim 1, wherein applying the one or more machine learning techniques to the current balanced log data comprises:
utilizing logistic regression to determine relationships between at least one dependent variable of the current balanced log data and one or more independent variables of the current balanced log data.

3. The method of claim 1 further comprising:
generating a dictionary for the current tabular log data, the dictionary comprising a dictionary list and dictionary entries for each element of log data.

4. The method of claim 3, further comprising:
splitting the current balanced log data into training data and testing data, wherein the training data and the testing data are utilized to verify the application failure predictive model's integrity.

5. A computer-implemented method comprising:
obtaining current raw log data from at least one application log of at least one software application;
converting, by at least one processor, the current raw log data into current tabular log data;
configuring the current tabular log data into a readable tabular format;
applying, by the at least one processor, one or more sampling techniques to the current tabular log data to form current balanced log data, wherein the current balanced log data includes previous incidents of failures of the at least one software application;
applying, by the at least one processor, one or more machine learning techniques to the current balanced log data to generate an application failure predictive model based on the previous incidents of failures of the at least one software application;
generating, by the at least one processor, at least one indication of at least one future failure of the software application based on one or both of future balanced log data and/or the application failure predictive model; and
causing, by the at least one processor, based on the at least one indication, at least one remedial activity to be performed to or with the software application to mitigate or avoid the at least one future failure of the software application;
wherein the configuring the tabular data into the readable tabular format comprises generating a dictionary and fields that provide additional details regarding the log data, wherein the dictionary and fields are stored with the readable tabular format of the tabular data in a virtual environment.

6. The method of claim 5, wherein the raw log data comprises outbound logs, inbound logs, and batch logs.

7. The method of claim 5, wherein the one or more sampling techniques comprise an undersampling technique.

8. The method of claim 7, wherein the undersampling technique comprises:
parsing the current tabular log data into majority class data and minority class data;
reducing the majority class data to a size commensurate with the size of the minority class data; and
generating the current balanced log data using the reduced-size majority class data and the minority class data.

9. The method of claim 5, further comprising:
transforming the raw log data into a readable format; and
generating input date, time, logType, and message fields for each instance of the transformed raw log data.

10. The method of claim 5, wherein applying the one or more machine learning techniques to the current balanced log data comprises utilizing logistic regression to determine relationships between at least one dependent variable of the current balanced log data and one or more independent variables of the current balanced log data.

11. The method of claim 10, wherein the logistic regression comprises a least absolute shrinkage and selection operator (LASSO) logistic regression that performs variable selection and regularization of the current balanced log data.

12. The method of claim 5, further comprising:
splitting the current balanced log data into training data and testing data, wherein the training data and the testing data are utilized to verify the application failure predictive model's integrity.

13. The method of claim 5, wherein the applying the one or more sampling techniques to the current tabular log data comprises one hot encoding the current tabular log data.

14. The method of claim 5, further comprising:
configuring the tabular data into a readable tabular format, wherein one or both of the applying the one or more sampling techniques and/or the applying the one or more machine learning techniques are performed on the readable tabular format of the tabular data.

15. A computer-implemented method comprising:
obtaining current raw log data from at least one application log of at least one software application;
converting, by at least one processor, the current raw log data into current tabular log data;
applying, by the at least one processor, one or more sampling techniques to the current tabular log data to form current balanced log data, wherein the current balanced log data includes previous incidents of failures of the at least one software application;
applying, by the at least one processor, one or more machine learning techniques to the current balanced log data to generate an application failure predictive model based on the previous incidents of failures of the at least one software application;
generating, by the at least one processor, at least one indication of at least one future failure of the software application based on one or both of future balanced log data and/or the application failure predictive model; and
causing, by the at least one processor, based on the at least one indication, at least one remedial activity to be performed to or with the software application to mitigate or avoid the at least one future failure of the software application;
creating a dictionary for the current tabular log data, the dictionary having a dictionary entry for each instance of log data;
updating one or more string names associated with one or more dictionary entries to numerical values, including:
processing a list of dictionary entries and a category variable;
looping-through a list of job names, from the one or more string names, to parse out a Business name, a Log Function name, a Business Function name, a Business Process name, and a numerical Log name;
looping-through a list of Business names, correlating each said Business name to a number, and returning a first numerical value;
looping-through a list of Log Function names, correlating each said Log Function name to a number, and returning a second numerical value;
looping-through a list of Business Function names, correlating each said Business Function name to a number, and returning a third numerical value;
looping-through a list of Business Process names, correlating each said Business Process name to a number, and returning a fourth numerical value; and
creating the numerical Log name via combining two or more of the first numerical value, the second numerical value, the third numerical value, and the fourth numerical value together to form the numerical Log name, wherein each said numerical Log name comprises a complete unique numerical identifier for each string name.

16. A computer-implemented method comprising:
converting, by at least one processor, current raw log data from or associated with at least one application log of at least one software application into current tabular log data;
updating a dictionary associated with the current tabular log data, including:
processing dictionary list entries comprised of an argument field, an index field, a Dictionary List field, a Log Category field, a Business Name field, a Log Function field, a Business Function field, a Business Process field, and a Log Name field; and
updating and adding fields comprising the Log Category field, the Business Name field, the Log Function field, the Business Function field, the Business Process field, and a Log Name to the dictionary, wherein the Log Name is a unique numerical identifier created by combining a plurality of fields into one unique value;
applying, by the at least one processor, one or more sampling techniques to the current tabular log data to form current balanced log data, wherein the current balanced log data includes previous incidents of failures of the at least one software application;
applying, by the at least one processor, one or more machine learning techniques to the current balanced log data to generate an application failure predictive model based at least in part on the previous incidents of failures of the at least one software application;
generating, by the at least one processor, at least one indication of at least one future failure of the software application based on future balanced log data and the application failure predictive model; and
causing, by the at least one processor, based on the at least one indication, at least one remedial activity to be performed to or with the software application to mitigate or avoid the at least one future failure of the software application.

17. The method of claim 16, further comprising:
generating the dictionary for the current tabular log data, the dictionary having a dictionary entry for each instance of log data, wherein dictionary entries are comprised of 5 or more of log name, date, time, timestamp, message, category, day of the week, month of the year, success, hour of the day, minute of the hour, and/or day of the month.

18. The method of claim 16, further comprising:
generating the dictionary for the current tabular log data, the dictionary comprising a dictionary list and dictionary entries for each element of log data.

19. The method of claim 16, wherein the one or more sampling techniques comprise an undersampling technique.

* * * * *